United States Patent [19]
Newman et al.

[11] Patent Number: 5,852,601
[45] Date of Patent: Dec. 22, 1998

[54] METHOD AND APPARATUS FOR REACTIVE CONGESTION CONTROL IN AN ASYNCHRONOUS TRANSFER MODE (ATM) NETWORK

[75] Inventors: Peter Newman, Mountain View; Willie T. Glover; Gururaj Singh, both of San Jose; Amar Gupta, Cupertino; Clifford James Buckley, San Jose, all of Calif.

[73] Assignee: Network Equipment Technologies, Inc., Fremont, Calif.

[21] Appl. No.: 870,755

[22] Filed: Jun. 9, 1997

Related U.S. Application Data

[63] Continuation of Ser. No. 456,386, Jun. 1, 1995, abandoned, which is a continuation of Ser. No. 116,500, Sep. 2, 1993, abandoned, which is a continuation of Ser. No. 756,463, Sep. 9, 1991, abandoned.

[51] Int. Cl.$^6$ .................................. H04J 3/14; H04J 3/26
[52] U.S. Cl. ........................ 370/230; 370/236; 370/410
[58] Field of Search .................................... 370/230, 232, 370/235, 236, 253, 395, 397, 410

[56] References Cited

U.S. PATENT DOCUMENTS

| | | | |
|---|---|---|---|
| 5,029,164 | 7/1991 | Goldstein et al. | 370/95.1 |
| 5,090,011 | 2/1992 | Fukuta et al. | 370/60 |
| 5,115,429 | 5/1992 | Hluchyj et al. | 370/94.1 |
| 5,119,372 | 6/1992 | Verbeek | 370/60 |
| 5,130,978 | 7/1992 | Mobasser | 370/94.1 |
| 5,280,470 | 1/1994 | Buhrke et al. | 370/60.1 |

*Primary Examiner*—Min Jung
*Attorney, Agent, or Firm*—David E. Lovejoy

[57] ABSTRACT

Reactive congestion control in an asynchronous transfer mode (ATM) network where the network is formed by the interconnection of nodes each including a forward path for transfer of information from source to destination through the network and a return path for returning congestion control signals. Each source includes a modifiable issue rate unit which issues forward information signals at different rates for virtual channels in response to the presence and absence of congestion signals received on the return path.

49 Claims, 7 Drawing Sheets

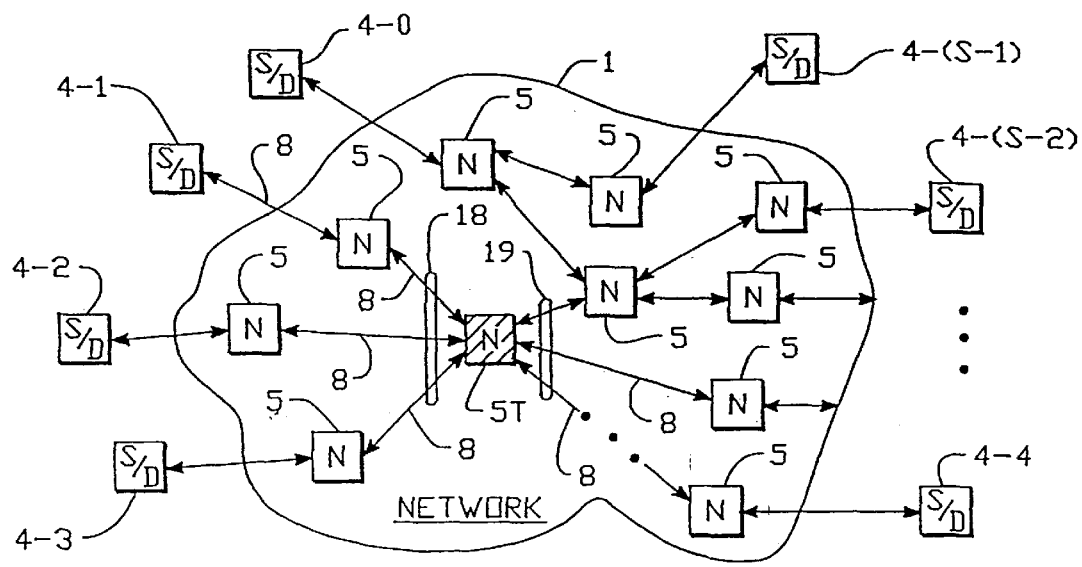
FIG.—1
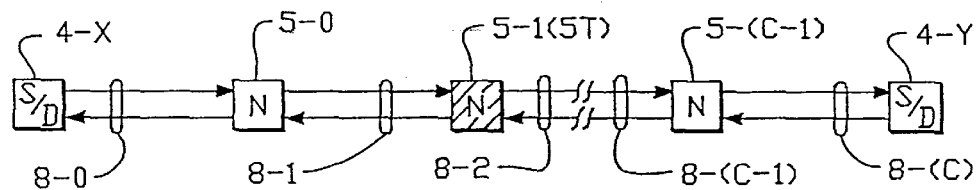
FIG.—2
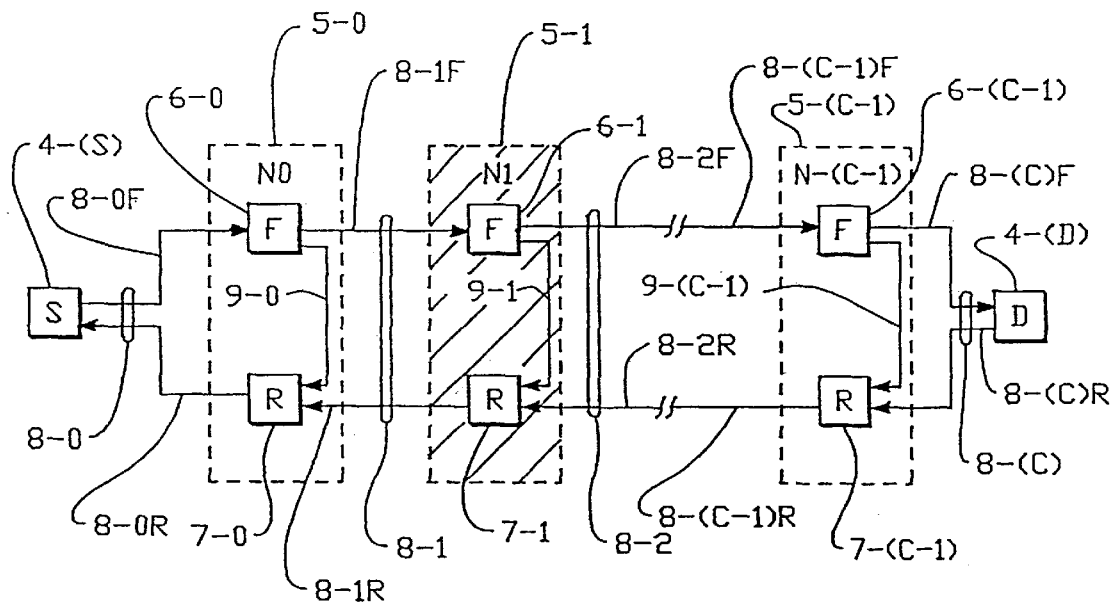
FIG.—3

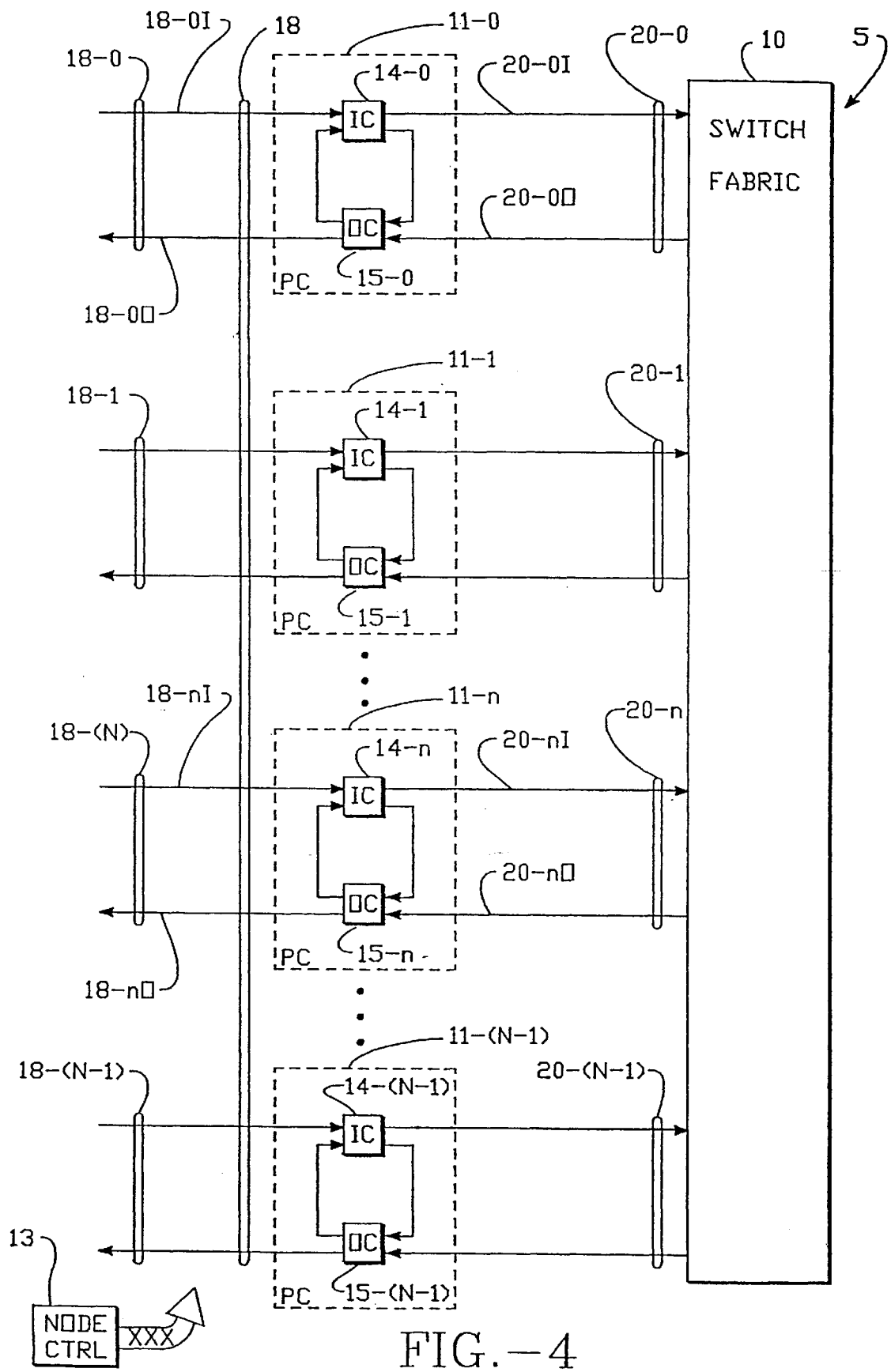
FIG.—4

FIG.—6

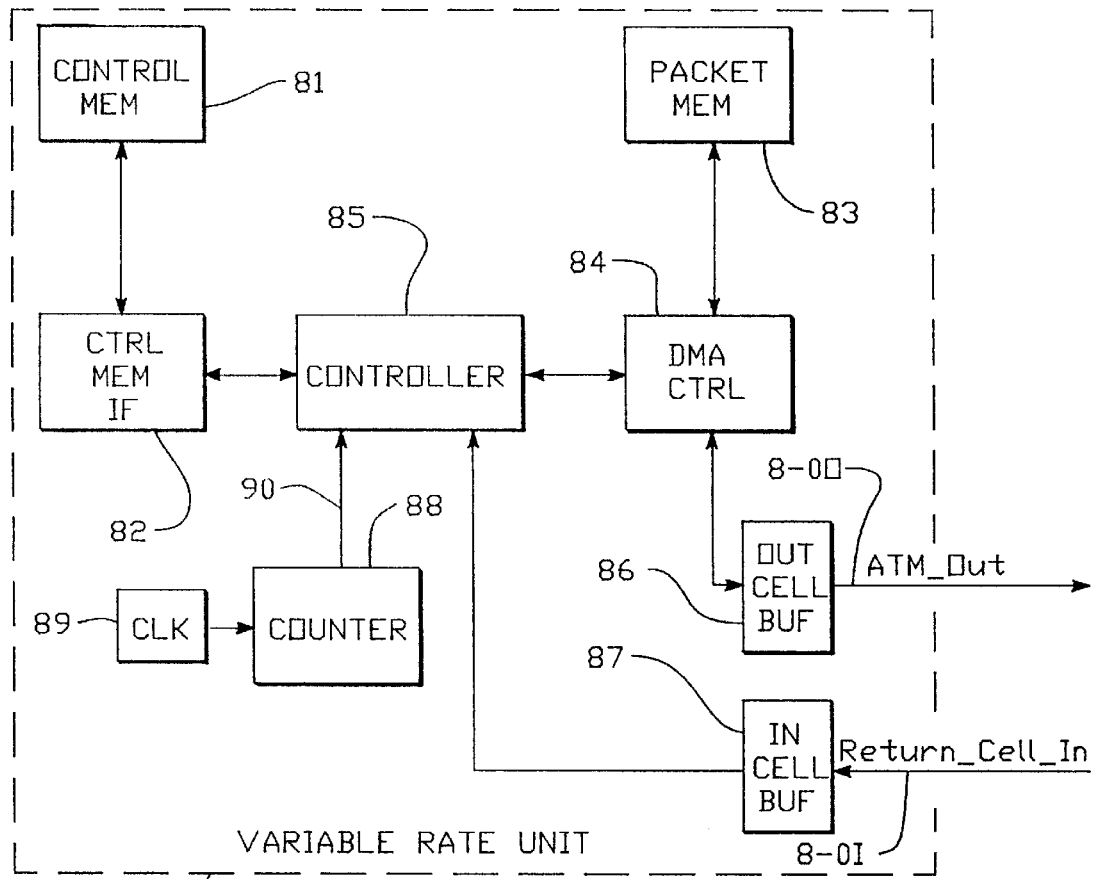
FIG.—8
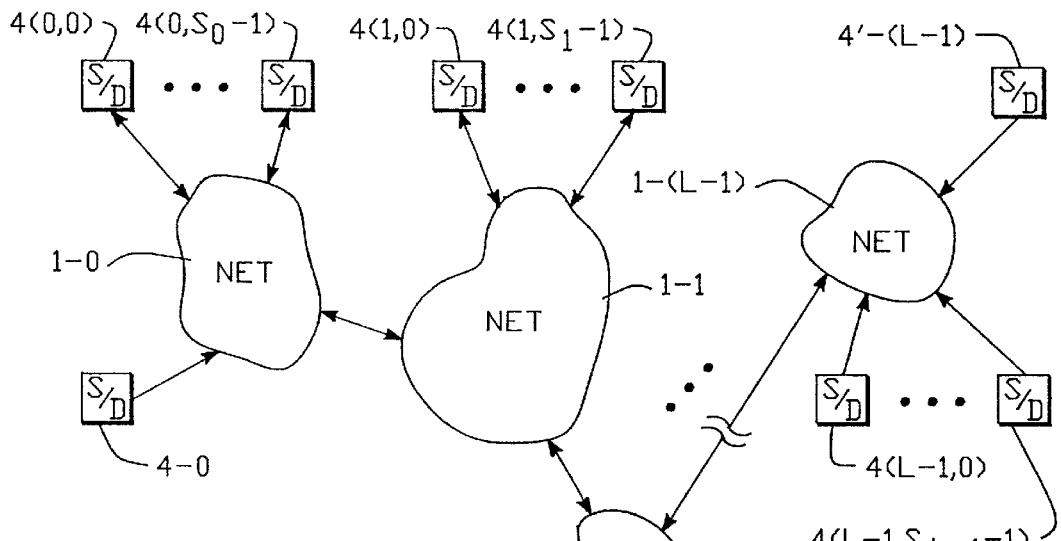
FIG.—9

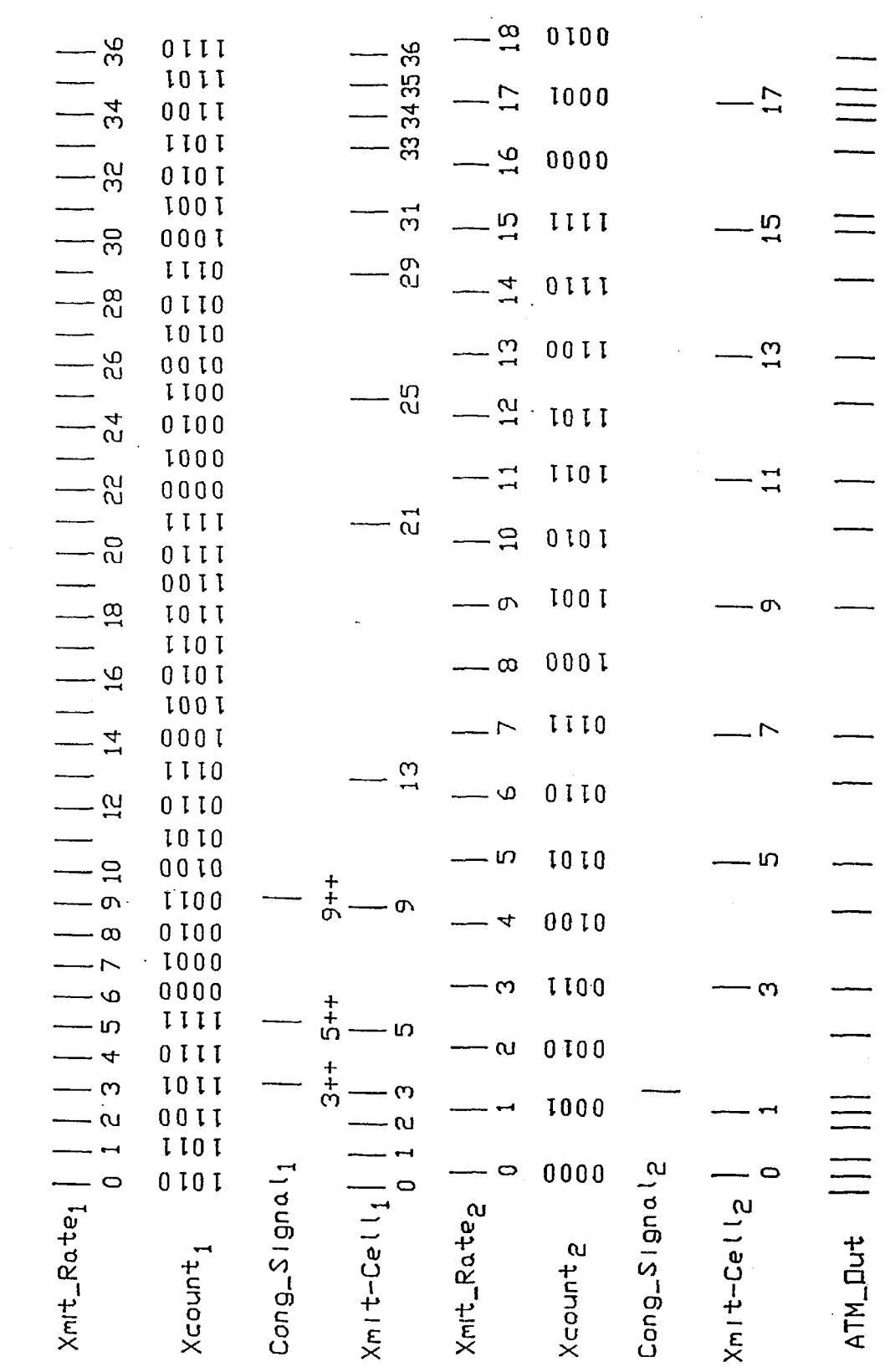

FIG.—10

METHOD AND APPARATUS FOR REACTIVE CONGESTION CONTROL IN AN ASYNCHRONOUS TRANSFER MODE (ATM) NETWORK

CROSS-REFERENCE TO RELATED APPLICATIONS

This application is a continuation application of Ser. No. 08/456,386, filed Jun. 1, 1995, now abandoned, which is a continuation of Ser. No. 08/116,500, filed Sep. 2, 1993, now abandoned, which is a continuation of Ser. No. 07/756,463, filed Sep. 9, 1991, now abandoned.

U.K. Application Serial No. 87 24208

Filed: Oct. 15, 1987

Title: SELF-ROUTING SWITCHING ELEMENT FOR

AN ASYNCHRONOUS TIME SWITCH

U.S. application Ser. No. 07/258,291

Filed: Oct. 14, 1988

Title: SELF-ROUTING SWITCHING ELEMENT FOR

AN ASYNCHRONOUS TIME SWITCH

U.S. application Ser. No. 07/582,254

Filed: Sep. 14, 1990

Title: SELF-ROUTING SWITCHING ELEMENT AND

FAST PACKET SWITCH

U.S. application Ser. No. 07/602,409

Filed: Oct. 22, 1990

SELF-ROUTING SWITCHING ELEMENT AND

FAST PACKET SWITCH

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to fast packet communication systems and more particularly to asynchronous transfer mode (ATM) switches in communication networks.

Network communication systems interconnect many users in a network. Each user is connected to the network at a port. The network is formed by the interconnection of many nodes where information input at an input port from one user at a source is passed from node to node through the network to an output port and to another user at a destination. The information transferred from source to destination is packetized and each node switches incoming packets at incoming ports to outgoing packets at outgoing ports. For ATM networks, the packets are further divided into cells.

Fast packet switches may transfer hundreds of thousands of packets per second at every switch port. Each switch port is typically designed to transfer information at a rate from 50 Mbits/s to 600 Mbit/s for a broadband integrated service digital network (ISDN). Switch sizes range from a few ports to thousands of ports.

The term "fast packet switch" includes switches capable of handling both variable length packets-and fixed length packets. Fixed-length packets are desirable since they simplify the switch design. Fast packet switches using short, fixed-length packets (cells) are referred to as asynchronous transfer mode (ATM) switches. Fast packet switches handle different types of communications services in a single integrated network where such services may include voice, video and data communications. Since voice and video services can tolerate only a limited amount of delay and delay variance through a network, ATM switches are suitable for such services. The ATM standard for broadband ISDN networks defines a cell having a length of 53 bytes with a header of 5 bytes and data of 48 bytes.

In a typical ATM switch, the cell processing functions are performed within the nodes of a network. Each node is an ATM switch which includes input controllers (IC's), a switch fabric (SF), output controllers (OC's) and a node control (C). The node control is used for functions including connection establishment and release, bandwidth reservation, congestion control, maintenance and network management.

In each switch, the input controllers are typically synchronized so that all cells from input controllers arrive at the switch fabric at the same time and so that cells can be accepted or rejected according to their priority. The traffic through the switch fabric is slotted and the switch fabric delay equals the sum of the timeslot duration, pipeline delay, and the queueing delay.

The node control communicates with the input controllers and the output controllers either by a direct communication path which by-passes the switch fabric or via control cells transmitted through the switch fabric.

External connections to the switch are generally bidirectional. Bidirectional connections are formed by grouping an input controller (IC) and an output controller (OC) together to form a port controller (PC).

The input sequence of cells in a virtual channel is preserved across the switch fabric so that the output sequence of cells on each virtual channel is the same as the input sequence. Cells contain a virtual channel identifier VCI in the cell header which identifies the connection to which the cell belongs. Each incoming VCI identifier in the header of each cell is translated in an input controller to specify the outgoing VCI identifier. This translation is performed in the input controller typically by table look-up using the incoming VCI identifier to address a connection table. This connection table also contains a routing field to specify the output port of the switch fabric to which the connection is routed. Other information may be included in the connection table on a per connection basis such as the priority, class of service, and traffic type of the connection.

In an ATM switch, cell arrivals are not scheduled. In a typical operation, a number of cells may arrive simultaneously at different input ports each requesting the same output port. Operations in which requests exceeding the output capacity of the output port are referred to as output contention (or conflict). Since an output port can only transmit a fixed number (for example, one) cell at a time, only the fixed number of cells can be accepted for transmission so that any other cells routed to that port must either be discarded or must be buffered in a queue.

Different methods are employed for routing cells through a switch module, for example, self-routing and label routing.

A self-routing network operates with an input controller prefixing a routing tag to every cell. Typically, the input controller uses a table lookup from a routing table to obtain the routing tag. The routing tag specifies the output port to which the cell is to be delivered. Each switching element is able to make a fast routing decision by inspecting the routing tag. The self-routing network ensures that each cell will arrive at the required destination regardless of the switch port at which it enters.

A label routing network operates with a label in each cell referencing translation tables in each switching element. The label is translated in each switching element and hence any arbitrary network of switching elements may be employed.

Switches have two principal designs, time-division and space division. In a time-division switch fabric, all cells flow through a single communication channel shared in common by all input and output ports. In a space division switch, a plurality of paths are provided between the input and output ports. These paths operate concurrently so that many cells may be transmitted across the switch fabric at the same time. The total capacity of the switch fabric is thus the product of the bandwidth of each path and the average number of paths that can transmit a cell concurrently.

When the traffic load exceeds the available system resources in a network, congestion is present and performance degrades. When the number of cells is within the carrying capacity of the network, all cells can be delivered so that the number of cells delivered equals the number of cells sent without congestion. However, if cell traffic is increased to the level that nodes cannot handle the traffic, congestion results.

Congestion can be brought about by several factors. If nodes in a network are too slow to perform the various tasks required of them (queueing buffers, updating tables, etc.), queues build up, even though excess line capacity exists. On the other hand, even if nodes are infinitely fast, queues will build up whenever the input traffic rate exceeds the capacity of the output traffic rate for any particular group of outputs.

If a node has no free buffers for queuing cells, the node must discard newly arriving cells. For packet data traffic, when a cell is discarded, the packet from which the discarded cell came will be retransmitted, perhaps many times, further aggravating the congestion.

A difference exists between congestion control and flow control. Congestion control relates to insuring that each part of the network is able to carry the offered traffic. Congestion control is a network-wide consideration involving the behavior and carrying capacity of each part of the network at the time that traffic is offered to each part of the network.

Flow control, in contrast, relates to the point-to-point traffic between a given source and a given destination. Flow control insures that a source does not continually transmit data faster than the destination can receive it. Flow control generally involves direct feedback from the destination to the source to signal the source as to the availability of the destination to receive transmissions from the source.

Packet Congestion Control Algorithms

Congestion control algorithms for packet switches have included preallocating resources, packet discarding, packet restricting, flow control, and input choking.

The preallocating of resources avoids a congestion problem for virtual channels. When a virtual channel is set up, a call request travels through the network making table entries at each node that control the route to be followed by subsequent traffic. With preallocating, each call request reserves one or more data buffers in each node unless all the buffers are already reserved. If all buffers are reserved, another route is found or a "busy signal" is returned to the source. If buffers are reserved for each virtual channel in each node, there is always a place to store any incoming packet to that node. The problem with preallocation is that substantial buffer resources are allocated to specific virtual channel connections, whether or not there is any traffic over the virtual channel. An inefficient use of resources results because resources not being used by the connection to which they are allocated are nevertheless unavailable to other virtual channels.

With packet discarding, if a packet arrives at a node and there is no place to store it, the node discards it. Congestion is resolved by discarding packets at will. A copy of the packet is kept elsewhere and retransmitted later. Discarding packets at will, if carried too far, results in inefficient operation since the retransmission tends to increase traffic in an already congested network.

Packet restricting limits the number of packets at any location in a network to avoid congestion since congestion only occurs when there is an excessive number of packets at a particular location in the network. Packet restricting is performed in one method by issuing permits. Whenever a node requests sending a packet, the node must first obtain a permit. When the destination finally receives the packet, the permit is again made available for reuse. Although the permit method guarantees that the network as a whole will never become congested, it does not guarantee that a given node will not become swamped with packets. Also, the permit distribution mechanism is difficult to implement without suffering long delays.

Flow control has been used in some networks (for example, ARPANET) in an attempt to eliminate isolated congestion. For example, flow control has been used by the transport layer to keep one host from saturating another host and by one node to prevent that node from saturating its neighbor node. However, flow control has not been effective to solve network-wide congestion.

Input choking has been used to control congestion. Whenever congestion is detected, a choke packet is sent back to the source to choke off input packets. To determine congestion, each newly arriving packet at a node is checked to see if its output line is congested. When congestion is detected at a node, the node sends a choke packet back to the source identifying the destination having congestion. When a source receives a choke packet, the source reduces by some factor the traffic sent to the specified destination. Other packets having the same destination that are already under way generate additional choke packets that are ignored by the source for a first time period. After that first time period has expired, the source looks for more choke packets for a second time period. If during the second time period a choke packet arrives indicating that the line is still congested, the source reduces the flow still more and repeats the process. If no choke packets arrive during a subsequent second time period, the source increases the flow again. The feedback in this protocol tends to prevent congestion but does not throttle flow until congestion is detected.

Several variations on the input choking algorithm have been proposed for packet switches. In one variation, the nodes maintain two congestion thresholds. Above the first threshold but below the second, choke packets are sent back. Above the second threshold, incoming traffic is discarded, it being assumed by the second threshold that the host has received notification of the congestion.

Another input choking variation is to use queue lengths instead of line utilization as the trigger signal for congestion. Another choking variation has nodes propagate congestion information along with routing information, so that the congestion trigger is not based on information from only one node, but on information that somewhere along the path there is congestion. By propagating congestion information in the network, choke packets can be sent at an early time, before too many more packets are under way, thus preventing congestion from building up.

SUMMARY OF THE INVENTION

The present invention is a method and apparatus for reactive congestion control in an asynchronous transfer mode (ATM) network where the network is formed by the interconnection of nodes. Each of the nodes includes a forward path for transfer of information from source to destination through the network and a return path for returning explicit congestion control signals. Each source includes a modifiable issue rate unit which issues forward information signals at different rates for virtual channels in response to the presence and absence of congestion signals received on the return path.

In accordance with one feature of the present invention, the cumulative delay for the congestion signal returning from the location where congestion is detected to the source is made small by making the congestion signal processing time at each node much smaller than the return path delay from node to node. In this manner, the return path congestion signal arrives quickly at the source to cause the variable issue rate source to modify the issue rate thereby helping to reduce congestion.

In accordance with one feature of the present invention, the variable issue rate unit has an exponential rate for reducing the issue rate in response to receipt of congestion signals. In another feature, the variable rate source has an exponential increase in the issue rate in the absence of congestion control signals after the issue rate has been reduced.

In accordance with one aspect of the present invention, each switching element is composed of port controllers which have an input controller and an output controller. In order to minimize the time required for processing return congestion control signals, an input to output controller return path is provided for copying a cell, having a virtual channel identifier, from the forward path to the reverse path without requiring processing cycles to generate the congestion control signal. If the virtual channel identifier has been translated for the cell in the forward direction at a node, the translation is reversed for the reverse path signal so that for any particular link, the same virtual channel identifier is used in the return path as in the forward path. In this manner, processing time is saved so that the congestion signal processing time is much less than the return path delay time between nodes.

In accordance with another embodiment of the present invention, one or more control path buffers are connected in parallel with data buffers whereby congestion control signals are given priority over data signals.

The foregoing and other objects, features and advantages of the invention will be apparent from the following detailed description in conjunction with the drawings.

BRIEF DESCRIPTION OF THE DRAWINGS

FIG. 1 depicts a schematic block diagram of a plurality of source/destination (S/D) users connected through a multinode network.

FIG. 2 depicts a schematic representation of a circuit with one S/D user connected to another S/D user through a sequence of nodes in the network of FIG. 1.

FIG. 3 depicts a schematic representation of the FIG. 2 circuit with a virtual channel connection of the source (S) sending information in a forward direction (F) to a destination (D) and with a reverse direction (R) for transmitting control signals to the source (S).

FIG. 4 depicts a schematic representation of a typical one of the nodes (N) in the FIG. 1 network.

FIG. 8 depicts a schematic block diagram of a variable rate unit used within the sources of FIG. 1.

FIG. 9 depicts a schematic block diagram of a plurality of source/destination (S/D) users connected through a wide-area multinode network formed of a plurality of local networks.

FIG. 10 depicts timing diagrams representative of the operation of a network in response to congestion.

DESCRIPTION OF THE PREFERRED EMBODIMENTS

Overall Network—FIG. 1

Figure 5:
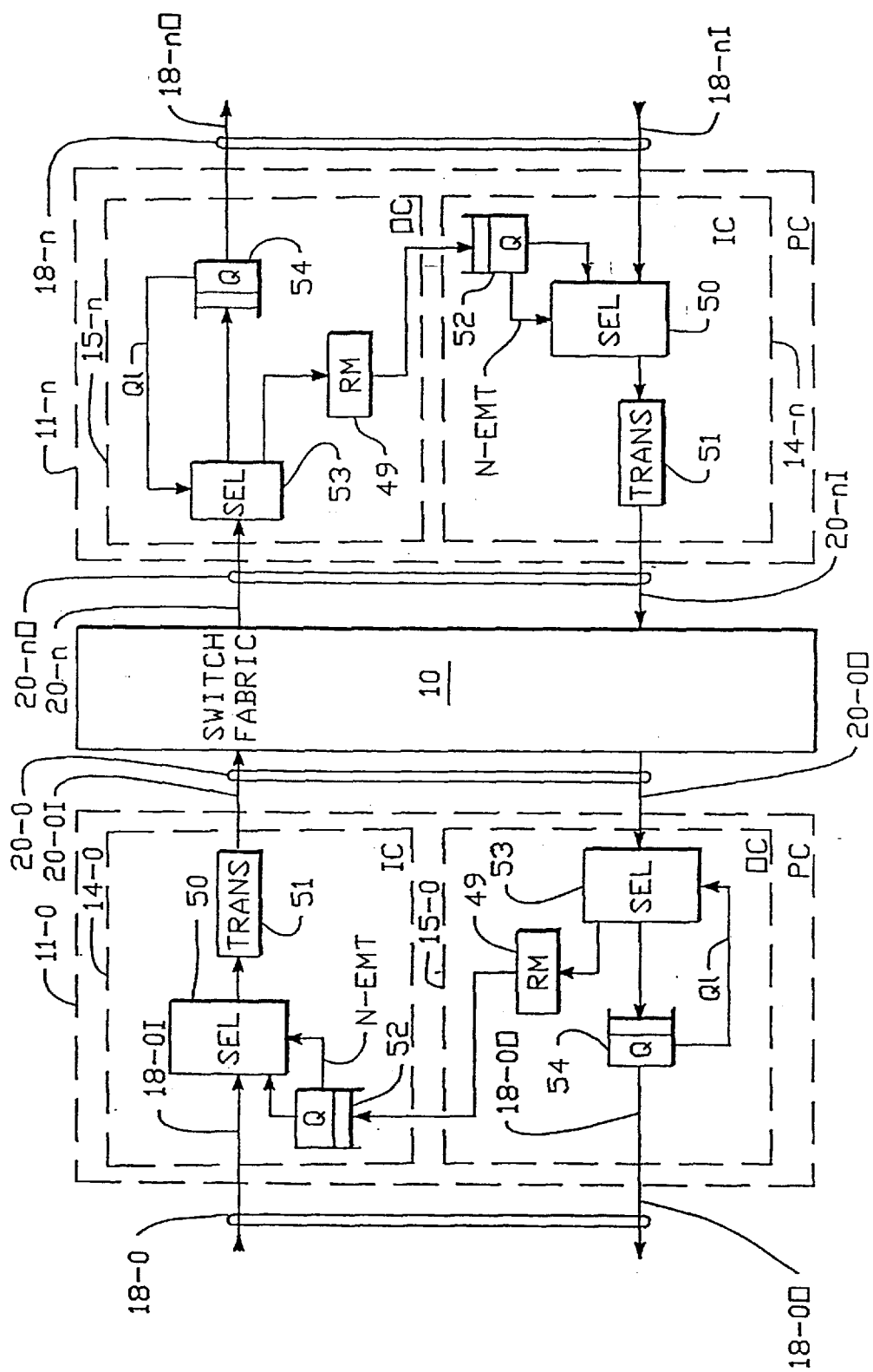
FIG. 5 depicts further details of one embodiment of the typical node of FIG. 4.

In FIG. 1, a plurality of network users are represented as the source/destination (S/D) 4. Each user typically sends information as a source (S) and receive information as a destination (D). The source (S) of an S/D unit 4 will send information to the destination (D) of some other S/D unit 4. In order for information to be transferred from a source to a destination, each S/D unit 4 connects through a multinode (N) network 1. The network 1 includes many nodes (N) 5. The nodes are connected from node to node so that, in general, any particular one of the S/D units 4 can connect to any one of the other S/D units 4 by forming a chain of nodes 5 in the network 1. In general, the connections between the S/D units 4 and a node 5, and the connections between nodes 5, are by bidirectional links 8 which enable information to be transferred in both directions.

In FIG. 1, the number of nodes (N) 5 shown is for clarity a relatively small number, but the network may include hundreds or more nodes. Also, the S/D units 4 include the S users 4-0, 4-1, 4-2, 4-3, 4-4, . . . , 4-(S-2), 4-(S-1). The value of S can be any integer where S is typically equal to hundreds or higher.

In a typical embodiment, the FIG. 1 communication system is an ATM network in which the unit of transfer of information is a cell. A plurality of cells form packets of information. The network 1 communicates cells and packets so as to support different types of information including images, voice and data.

Virtual Channel—FIG. 2

In FIG. 2, the S/D unit 4-x connects through a plurality C of nodes (N) 5-0, 5-1, . . . , 5-(C-1) to the SID unit 4-y.

In FIG. 2, the S/D unit 4-x is typical of any of the SID units 4 of FIG. 1. For example, the S/D unit 4-x may represent the SID unit 4-2 in FIG. 1. Similarly, the SID unit 4-y in FIG. 2 may represent any of the S/D units 4 in FIG. 1. For example, SID unit 4-y may represent the SID unit 4-4 in FIG. 1. In such an example, the nodes 5-0, 5-1, . . . , 5-(C-1) represent the C nodes in the network 1 of FIG. 1 which are used to connect the S/D unit 4-2 to the S/D unit 4-4.

In FIG. 2, the bi-directional links 8-0, 8-1, ..., 8-(C-1), 8-(C) connect from the SID unit 4-x through the nodes 5-0, 5-1, ..., 5-(C-1) to the SID unit 4-y.

In FIG. 2, information may be transferred from the source (S) in the SID unit 4-x to the destination (D) in the SID unit 4-y. Similarly, information from the source (S) in the SID unit 4-y can be transferred to the destination (D) in the S/D unit 4-x. While information may be transferred in either direction in FIG. 2, it is convenient, for purposes of explanation to consider transfers between a source (S) and a destination (D) whether that be from the S/D unit 4-x to the S/D unit 4-y or from the S/D unit 4-y to the S/D unit 4-x. Regardless of the direction, each transfer is from a source (S) to a destination (D).

S to D Transfers—FIG. 3

In FIG. 3, a schematic representation of the circuitry used for a source (S) to destination (D) transfer in the virtual channel of FIG. 2 is shown. In FIG. 3, the source unit 4-(S) in the S/D unit 4-x of FIG. 2 connects to the destination unit 4-(D) in the S/D unit 4-y of FIG. 2.

In FIG. 3, each of the links 8-0, 8-1, ..., 8-(C-1), 8-(C) includes a forward (F) channel for transferring information in the forward direction and a reverse (R) channel for transferring information in the reverse direction. The reverse channel in FIG. 3 is associated with the transfer of information from the source unit 4-(S) to the destination unit 4-(D). The reverse channel in FIG. 3 is for the purpose of sending control information used in connection with congestion control within the network of FIG. 1. The reverse channel (R) is distinguished from the forward channel (F) used for the transfer of information in the forward direction from S/D unit 4-y to S/D unit 4-x, as discussed in connection with FIG. 2. Both the forward (F) and the reverse (R) channels are associated with the source unit 4-(S) transfer to the destination unit 4-(D). Each of the nodes in FIG. 3 includes forward (F) circuitry 6 and reverse (R) circuitry 7. In FIG. 3, the forward channels 8-0F, 8-1F, ..., 8-(C-1)F connect as inputs respectively to the forward circuits 6-0, 6-1, ..., 6-(C-1). The forward channel 8-(C)F connects from the node 6-(C-1) to the D unit 4-(D). Similarly, the reverse channels 8-0R, 8-1R, ..., 8-(C-1)R connect from the reverse circuits 7-0, 7-1, ..., 7-(C-1). The reverse channel 8-(C)R connects from the D unit 4-(D) to the reverse circuit 7-(C-1).

In FIG. 3, each of the nodes 5 has a feedback connection 9 connecting from the forward (F) circuit 6 to the reverse (R) circuit 7. Specifically, the feedback channels 9-0, 9-1, ..., 9-(C-1) connect from the forward (F) circuits 6 to the reverse (R) circuits 7 in the nodes 5-0, 5-1, ..., 5-(C-1), respectively. In the FIG. 3 circuit, a virtual channel connection is made along the forward channel setting up a communication path in the forward direction between the S unit 4-(S) and the D unit 4-(D). Because other virtual channels are also established in the network 1 of FIG. 1, congestion may arise at any node or destination including the nodes of FIG. 3. The feedback channels 9 are utilized to send back an explicit congestion signal using the reverse (R) channels 8-()R and reverse circuits 7. When the source (S) unit 4-(S) receives an explicit congestion signal on the reverse channel 8-0R, source unit 4-(S) takes corrective action to reduce the congestion in the network. Specifically, in accordance with the present invention, source unit 4-(S) reduces the rate at which data is inserted over the forward channel through channel 8-0F from the assigned rate (Maximum Channel Peak Cell Rate) to some lower rate (Current Channel Peak Cell Rate). After a time period such that congestion is likely to have cleared, the source unit restores the insertion rate of information in the forward channel over the bus 8-0F to its original maximum rate.

Since the FIG. 3 virtual channel is typical of all of the virtual channels established in the network of FIG. 1, the combined operation of all the virtual channels in an ATM system is to dynamically control the insertion rate of input information, and specifically to reduce the insertion rate in the presence of congestion in the network and to increase the insertion rate in the absence of congestion in the network.

Each virtual channel, like the FIG. 3 virtual channel, in the FIG. 1 network functions with a feedback control for controlling the insertion rate of information into the network. In order for the feedback control 3 to have a good response time, the delay in time from the detection of congestion until the source unit takes corrective action should be small. In general, the feedback delay value has two basic components. The first component of delay is the circuit path delay for each node to node transfer required from the point of congestion back to the source. The second component of the delay is the delay signal processing time required in each node and in each reverse circuit 7 in order to transmit the explicit congestion signal through the node. The total feedback delay is, therefore, the sum of the node-to-node reverse signal transfer times and the sum of the reverse signal processing times. For any given system, the reverse signal transfer time from node to node is not readily changed and is substantially fixed for any particular system. The present invention causes the reverse signal processing time to be much less than the reverse signal transfer time. Therefore, substantially all of the feedback delay is a result of the reverse signal transfer time and the feedback processing time is small or negligible.

Simple Node Embodiment—FIG. 4

In FIG. 4, one typical embodiment of a node having the feedback control reverse signal paths of FIG. 3 is shown. In FIG. 4, the node 5 includes N links 18-0, 18-1, ..., 18-n, ..., 18-(N-1). Each of the links 18 of FIG. 4 are analogous to the bi-directional links 8 of FIG. 2.

In FIG. 4, the links 18-0, 18-1, ..., 18-n, ..., 18-(N-1) connect to port controllers 11-0, 11-1, ..., 11-n, ..., 11-(N-1).

The node of FIG. 4 is used in connection with the information transfer of FIG. 3, for example, by having one of the links 18, for example, input link 18-0 in FIG. 4, connect through switch fabric 10 to another one of the links 18, for example, link 18-n. In the example described, the switch fabric 10 functions to connect the link 18-0 to the link 18-n.

In an example where the node of FIG. 4 represents the node 5-1 in FIG. 2, the link 8-1 in FIG. 2 is the link 18-0 in FIG. 4 and the link 8-2 in FIG. 2 is the link 18-n in FIG. 4.

With such a connection, the node of FIG. 4 connects information in one direction, for example, from link 18-0 to link 18-n, and connects information in the opposite direction from the link 18-n to the link 18-0. The links 18-0 and 18-n were arbitrarily selected for purposes of explanation. Any of the N links 18 might have been selected in the FIG. 2 circuit for connection to any of the other links 18.

When the node of FIG. 4 is used in the virtual channel connection of FIG. 3 with the source (S) on the left and the destination (D) on the right, then for purposes of explanation it is assumed that the link 18-0 is an input to the node 5 in the forward direction and the link 18-n is output from the node in the forward direction.

In FIG. 4, port controllers (PC) 11-0, 11-1, ..., 11-n, 11-(N-1) have input controllers 14-0, 14-1, ..., 14-n, ..., 14-(N-1), respectively and have output controllers (OC)

15-0, 15-1, . . . , 15-n, . . . , 15-(N-1), respectively. In FIG. 4, forward information cells from the source 4-S of FIG. 3 sent to the destination 4-(D) of FIG. 3 connect from the bus 18-0I through the input controller 14-0 to the bus 20-nO through the switch fabric 10 to the bus 20-nI through the output controller 15-n to the bus 18-nO. If congestion is detected at the node 5, then an explicit congestion signal is connected, for example, from the output controller 15-n to the input controller 14-n to the bus 20-nI back through the switch fabric 10 to the bus 20-0O to the output controller 15-0 to the output bus 18-0O.

FIG. 5

In FIG. 5, a more detailed embodiment of the node of FIG. 4 is shown. In FIG. 5, the port controller 11-0 is shown typical of all of the port controllers 11 of FIG. 4. Similarly, the port controller 11-n is typical of all of the port controllers 11 of FIG. 4. In FIG. 4, the port controller 11-n is identical to the port controller 11-0 except that the images in port controller 11-n are flipped about 180° in order to provide symmetry in the drawing. As indicated in connection with FIG. 4, in the virtual channel of FIG. 3, the controller 11-0 of FIG. 5 serves as an input for forward going cells while the controller 11-n functions as an output for forward going cells.

In FIG. 5, the port controllers 11-0 and 11-n include input controllers (IC) 14-0 and 14-n each having a selector 50, a translator 51 and a reverse signal queue 52. The port controllers 11-0 and 11-n also include an output controller (OC) 15-0 and 15-n each having a selector (SEL) 53, a queue (Q) 54 and a reverse marker (RM) 49.

The operation of the FIG. 5 node in connection with the virtual channel of FIG. 3 is as follows. Forward transmitted cells appear on the bus 18-0I input to the selector 50 of the input controller 14-0. Selector 50 normally is set to select the input bus 18-0I unless the reverse queue 52 has congestion control information which must be returned in connection with the operation of some other virtual channel. If the not empty (N-EMT) signal is asserted indicating that congestion information is stored in the queue 52, selector 50 selects the output from queue 52 but otherwise selects the forward cells on bus 18-0I.

The translator 51 for each cell translates the value of the incoming virtual channel identifier (VCI) for the cell to an outgoing VCI for the cell, directs the cell to an outgoing link, and marks the priority of the cell. For example, the translator is implemented as a table storing values where the table is addressed by the incoming VCI.

The cell information together with the translated VCL appear on the bus 20-nO to the switch 53 in the output controller 15-n. Selector 53 normally selects the bus 20-nO for connection to the queue 54 unless queue 54 is filled beyond a threshold as indicated by the Ql signal. If the Ql signal is asserted, selector 53 connects the VCI and control information to the queue 52 through the reverse marker unit 49. Reverse marker unit 49 marks the VCI label with a reverse signal indication so that reverse signals can be distinguished from forward signals.

The threshold signal Ql indicating the fullness of queue 54 is a congestion signal that is transmitted back to the source 4-(S) of FIG. 3. If queue 52 has any information stored, it issues the N-EMT signal indicating a not empty condition to the selector 50 in the input controller 14-n. Selector .50 connects its output to the translator 51. Translator 51 translates the return signal VCI back to the original value (which appeared on the input bus 18-0I) so that switch fabric 10 receives the return path congestion signal on the bus 20-0O input to the selector 53. Selector 53, assuming that the queue 54 is not full, connects the return signal to the queue 54 for output on the return bus 18-0O. Accordingly, the translator 51 in the input controller 14-n reverses the translation done in the translator 51 in the input controller 14-0.

FIG. 6

Figure 6:
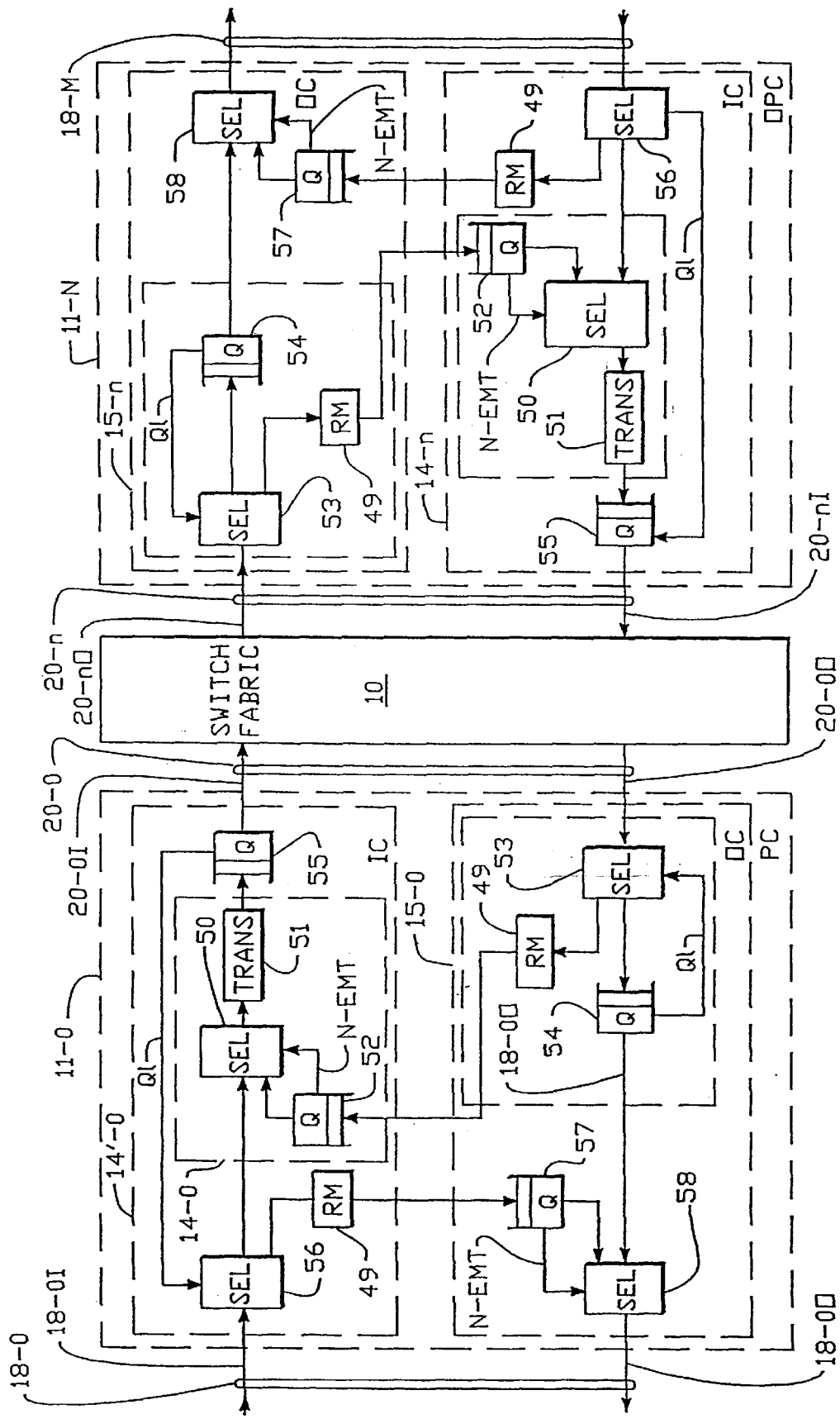
FIG. 6 depicts details of another embodiment of the node of FIG. 4.

In FIG. 6, an alternate embodiment of the FIG. 5 node is shown. In FIG. 6, the input controllers 14-0 and 14-n are the same as in FIG. 5. Similarly, the output controllers 15-0 and 15-n are the same as in FIG. 5. In FIG. 6, the input controllers 14'-0 and 14'-n are expanded to include a selector 56, a queue 55 and a reverse marker unit 49. Similarly, the expanded output controllers 15'-0 and 15'-n are expanded to include a bypass queue 57 and a selector 58.

In operation of the FIG. 6 node, selector 56 normally is operative to connect the input on forward bus 18-0I to the selector 50 unless information in the queue 55 exceeds the fullness threshold as indicated by a Ql signal. In the case of Ql, selector 56 sends the forward cell to marker unit 49 which marks the forward cell as a reverse cell and sends the cell in the reverse direction by placement in the queue 57. In this manner the reverse signal is selected by selector 58 for return on the reverse channel 18-0O. Note that this reverse signal requires no translation since the return occurs before the translation in translator 51. The selector 58 gives priority to return signals in the queue 57 over the reverse or forward path signals in the queue 54.

FIG. 7

Figure 7:
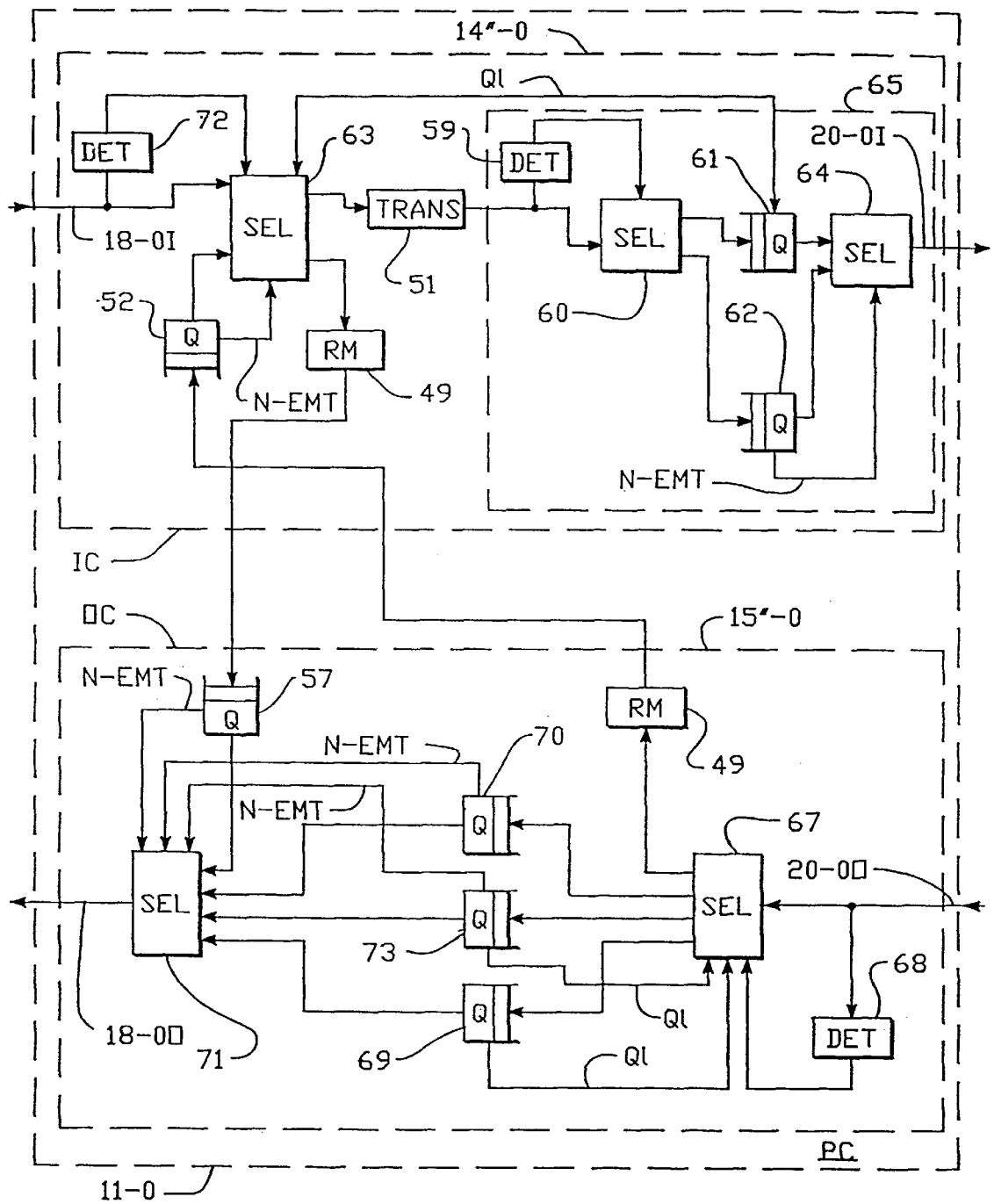
FIG. 7 depicts details of still another embodiment of the node of FIG. 4.

In FIG. 7, an alternate embodiment of the port controller structure for the nodes of FIGS. 2 through 6 is shown. In FIG. 7, the forward information cells appear on input bus 18-0I which are input to the selector 63. A detector 72 detects the input cells on bus 18-0I to determine if any of the cells are reverse cells signalling congestion in the network. If the signal on 18-0I is a reverse signal detected by detector 72, selector 63 has priority over any Ql signal from the queue 61 and sends the reverse signal through translator 51 to selector 60.

Selector 63 also selects the output of the reverse queue 52 whenever the not empty signal N-EMT is present. Whenever the information on bus 18-0I is forward cells, selector 63 forwards them the to the translator 51 unless the queue 61 issues a Ql signal in which case selector 63 sends the forward cells to marker unit 49 which marks them as reverse cells and sends them to the queue 57. Selector 63 determines priority between reverse cells on input bus 18-0I and reverse queue 52. In either case, selector 63 ignores any Ql signal from the queue 61 and forwards the reverse signals to selector 60. Detector 59 detects the presence of reverse cells and causes selector 60 to forward the reverse cells to the reverse queue 62. Reverse queue 62 is in parallel with the forward queue 61. When forward cells from bus 18-0I through selector 63 and translator 61 appear at switch 60, switch 60 connects them as an input to the forward queue 61. The outputs from queues 61 and 62 connect as inputs to the selector 64. Selector 64 selects the forward cells from the queue 61 unless the reverse queue 62 issues a not empty signal N-EMT.

In FIG. 7, the output controller 15"-0 includes the reverse queue 57, a reverse queue 70, a forward queue 73 and a forward queue 69. Detector 68 detects reverse cells on bus 20-0O which may carry either forward or reverse cells. Reverse cells are detected by detector 68 which provides an input to selector 67. If the cells on bus 20-0O are forward cells of high priority, selector 67 causes the forward cells to be stored into the queue 73 unless queue 73 is full. Queue 73 provides a not empty signal, N-EMT, to be issued to the selector 71 and a fullness level signal, Q1, to the selector 67. If the cells on bus 20-0O are forward cells and the forward queue 69 or 73 issues a Q1 signal, selector 67 causes the forward cells to send a congestion signal through marker unit 49 to the reverse queue 52 in the input controller 14"-0. If the cells on bus 20-0O are forward cells of lower priority and the forward queue 69 does not issue a Q1 signal, the forward cells are stored into the queue 69. If detector 68 detects reverse cells on the bus 20-0O, selector 67 directs the reverse signals into the reverse queue 70 which is in parallel with the forward queues 69 and 73. A not empty signal from the queue 70 is input to the selector 71. Selector 71 receives the not empty control signals from the reverse queues 57, 70, and 73. The presence of a not empty signal from queues 57, 70 or 73 causes switch 71 to grant priority to the reverse signal. Priority can be granted to the queue 57, to the queue 70 or to the queue 73. In the absence of any signals into queues 57, 70 and 73, the forward queue 69 is connected by selector 71 as the output on bus 18-0O.

FIG. 7 depicts one port controller which, as indicated in connection with FIG. 4, is associated with other port controllers on the switch fabric to form a node in the manner previously described.

Variable Rate Unit—FIG. 8

In FIG. 8, a variable rate unit 80 is shown which forms part of each source, for example, source 4-(S) in FIG. 3. The variable rate unit 80 upon receipt of a return cell signal, Return_Cell_In, on the reverse path 8-0O stores that signal as an explicit congestion signal in an input cell buffer 87. The cell buffer 87 provides that congestion signal to the controller 85. The Return_Cell_In signal includes a return cell which has a return indicator, for indicating that the cell is a return cell, and which has a pointer for pointing to a virtual channel identifier, Cong_Signal_VCI, which identifies the virtual channel which has experienced congestion.

The variable rate unit 80 includes a packet memory 83 and a direct memory access (DMA) control 84. During normal operation, the DMA control 84 obtains cells from the packets in packet memory 83 and outputs those cells to the cell buffer 86 for transmission in the forward direction on the forward bus 8-0O. The output rate on the bus 8-0O from the DMA controller 84 will normally be at the maximum cell rate for each virtual channel in the absence of a return cell indicating congestion received back on the bus 8-0O.

The variable rate unit 80 of FIG. 8 also includes a control memory 81 and a control memory interface 82. Control memory 81 stores control information about each virtual channel that is active to send information from packet memory 83 to the output channel 8-0O. The control information stored for each channel includes a congestion level value, Cong_Level, indicating the level of the reduced rate of transmission due to congestion on the virtual channel. The control information stored for each channel includes a recovery rate value, RC_Mode, indicating the rate of recovery of transmission rate after the rate has been reduced due to congestion on the virtual channel. The control information stored for each channel includes a counter field, Recovery_Count, for counting cells during congestion periods and a control field, RC_Inhibit, for controlling changes in rate during congestion periods.

Controller 85 accesses the control memory 81 through the memory interface 82 for each cell for every virtual channel being transmitted by the DMA controller 84. Upon receipt of a congestion signal, controller 85 modifies the control rate in the control memory 81 for that virtual channel and modifies the transmission rate used by the DMA controller 84 for that particular channel. In accord with specific algorithms, after the congestion signals are no longer existing for a particular virtual channel, the controller 85 again modifies the rate of transmitting the information for the virtual channel which was previously having congestion.

The apparatus for and the methods of operation of source units having packet memories and DMA controllers are well known. The modification of such sources is explained with reference to a number of terms used in connection with the variable rate unit 80 of FIG. 8 operating with a variable rate control algorithm.

Terms For Automatic Rate Control Algorithm

"Virt_Chan" identifies one of a number of virtual channels, where each virtual channel transmits ATM cells at a selected one of a number of Xmit_Rate rates unless, in response to an explicit congestion signal for that virtual channel, the transmission rate is modified by a congestion rate modification value, Cong_Level.

"Rate_Queue" is a list of virtual channel identifiers that identify virtual channels that are to be transmitted at a particular rate.

"Xmit_Rate" defines a number of transmission rates where each Xmit_Rate is the rate to transmit cells used by all of the virtual channels in a Rate_Queue.

"Xcount" defines a number of 4-bit counts, one for each Rate_Queue, where each Xcount for the corresponding Rate_Queue is incremented to count the cell transmission times at the full Xmit_Rate rate for that corresponding Rate_Queue.

"Xmit_Time" defines a number of state bits, one for each Rate_Queue, where each Xmit_Time state bit indicates when it is time to service the corresponding Rate_Queue. Each Xmit_Time state bit is set to the active state each time the Xcount is incremented for the corresponding Rate_Queue.

"Cong_Level" defines a number of 3-bit congestion level values, one for each virtual channel, where each value for the corresponding virtual channel is used to reduce the transmission rate of that corresponding virtual channel below the normal non-reduced Rate_Queue rate.

"RC_Mode" defines a number of 3-bit exponents, one for each virtual channel, where each exponent for the corresponding virtual channel is used to control the rate of restoring the transmission rate of that corresponding virtual channel back to the normal Rate_Queue rate after the transmission rate of that virtual channel has been reduced because of congestion. The rate of restoring is determined by a Recovery_Value=$2^{RC\_Mode}$.

"RC_Inhibit" defines a number of state bits, one for each virtual channel, where each RC_Inhibit state bit for the corresponding virtual channel is used to inhibit changes in Cong_Level during a period existing after a change in Cong_Level for that corresponding virtual channel and before a cell has been transmitted over that corresponding virtual channel.

"Recovery_Count" defines a number of 4-bit count values, one for each virtual channel, where each Recovery_Count value for the corresponding virtual channel is used for counting transmitted cells for that corresponding virtual channel as measured from the time that the last Cong_Signal was detected for that virtual channel. Recovery_Count is compared with Recovery_Value for the corresponding virtual channel to control restoring the transmission rate of cells for that corresponding virtual channel. When Recovery_Count equals Recovery_Value for the corresponding virtual channel, Cong_Level is incremented to thereby increase the transmission rate for the corresponding virtual channel.

"Cong_Signal" indicates the presence of one or more Cong_Signal_VCI identifiers stored in a queue for processing where the presence of Cong_Signal is used to trigger decrementing of the transmission rate of cells for the virtual channels identified by the Cong_Signal_VCI identifiers in the queue.

"Cong_Signal_VCI" are virtual channel identifiers, one for each virtual channel on which a cell has been returned to indicate congestion.

"Pkt_Loss_Signal" indicates the presence of one or more Pkt_Loss_VCI identifiers stored in a queue for processing where the presence of Pkt_Loss_Signal is used to trigger decrementing of the transmission rate of cells for the virtual channels identified by the Pkt_Loss_VCI identifiers in the queue.

"Pkt_Loss_VCI" are virtual channel identifiers, one for each virtual channel on which the loss of cells has occurred and has been interpreted as an indication of congestion.

Counter

In FIG. 8, the counter 88 is clocked by the clock unit 89 to provide timing for the variable rate unit 80. The controller 85 selects from among the parallel outputs 90 from counter 88 to provide clock signals that establish different transmission rates, Xmit_Rate, one for each Rate_Queue, for transmitting cells over the virtual channels in that Rate_Queue. A number of different rates can be established and in one embodiment, Q rates $Xmit\_Rate_0$, $Xmit\_Rate_1$, ..., $Xmit\_Rate_{Q-1}$ are established from counter 88. Each one of the Q Xmit_Rates is associated with a 4-bit Xcount which is incremented as a counter by the corresponding Xmit_Rate. Accordingly, the $Xcount_0$, $Xcount_1$, ..., $Xcount_{Q-1}$ counts are incremented by $Xmit\_Rate_0$, $Xmit\_Rate_1$, ..., $Xmit\_Rate_{Q-1}$ rates, respectively.

Each of the Q Xmit_Rates is associated with a corresponding queue, Rate_Queue, for storing virtual channel identifiers that identify virtual channels that have cells to be transmitted at the Xmit_Rate of the corresponding Rate_Queue. Accordingly, for uncongested normal operation, the virtual channels having identifiers stored in the $Rate\_Queue_0$, $Rate\_Queue_1$, ..., $Rate\_Queue_{Q-1}$ queues are serviced for transmitting cells over virtual channels at the $Xmit\_Rate_0$, $Xmit\_Rate_1$, ..., $Xmit\_Rate_{Q-1}$ rates, respectively.

Each of the Q Xmit_Rates and the corresponding Q Rate_Queues is associated in controller 85 with a state bit, Xmit_Time, for indicating when it is time to service the Rate_Queue. Accordingly, for uncongested normal operation, the $Rate\_Queue_0$, $Rate\_Queue_1$, ..., $Rate\_Queue_{Q-1}$ queues are serviced whenever the corresponding $Xmit\_Time_0$, $Xmit\_Time_1$, ..., $Xmit\_Time_{Q-1}$ state bits are set, respectively. Each Xmit_Time state bit is set to the active state each time the Xcount is incremented for the corresponding Rate_Queue.

Variable Rate Unit Controller

In FIG. 8, the variable rate unit controller 80 is constructed with conventional logic circuits which implement an automatic rate control algorithm. Although the logical functions can also be performed by programed processors, such programmed processors are generally too slow for high speed operations required for ATM systems. The operation of the controller 85 and the variable rate unit of FIG. 8 are described in connection with the following Table 1, Table 2, and Table 3.

Table 1 defines the parameter values for the automatic rate control algorithm. Table 2 defines the automatic rate control algorithm using pseudo code. Table 3 represents a sequenced operation of the variable rate control unit 85 of FIG. 8 operating in accordance with the Table 2 automatic rate control algorithm. Table 3 depicts a sequenced execution for a typical one of the Rate_Queues, $Rate\_Queue_1$, and for a typical one of the virtual channels, $Virt\_Chan_1$.

The operation of the variable rate unit 80 with the Table 3 example is further described in connection with FIG. 10. The times when $Xmit\_Time_1$ are active for $Xmit\_Rate_1$ are shown in FIG. 10 as times $XR_10$, $XR_11$, $XR_12$, $XR_13$, and so on. For purposes of explanation, it was assumed that after transmitting cells by virtual channel 1 with $Xmit\_Cell_1$ at $XR_10$, $XR_10$, $XR_12$, and $XR_13$, an explicit congestion signal $Cong\_Signal_1$ was returned at $XR_13+$ so that no cell was transmitted at $XR_14$ due to a decrease in the transmission rate. The operation of the Table 3 example continues thereafter in FIG. 10 both to further decrease the transmission rate and to thereafter recover the rate when congestion stops after $XR_19+$.

FIG. 10 also depicts another virtual channel transmitting at another rate, $Xmit\_Rate_2$, which is at one half the rate of $Xmit\_Rate_1$. One congestion signal, $Cong\_Signal_2$ is received at $XR_11+$ causing the cell transmission of $Xmit\_Cell_2$ to be at one half the $Xmit\_Rate_2$ rate. For clarity, recovery has been assumed to be disabled (RC_Mode=101–Disable_Recovery) for this virtual channel.

In FIG. 10, the ATM_Out line represents the sum of the $Xmit\_Cell_1$ and the $Xmit\_Cell_2$ lines and is the output on line 8-0O from the variable rate generator of FIG. 8.

It will be apparent from Tables 2 and 3 and from FIG. 10 that the issue rate unit of FIG. 8 decreases the issue rate (for example, $Xmit\_Cell_1$ rate) exponentially in response to a congestion signal. In Table 2, the PROCEDURE Rate Adjust at line 41 when embodied in circuitry is a means for decreasing the issue rate exponentially. Similarly, the Xmit Rate Recovery Routine at line 77 of Table 2 is a means for increasing the issue rate exponentially in response to the absence of a congestion signal. The rate of increasing the transmission rate, after it has been decreased in response to congestion, is less than the original rate used to decrease the transmission rate in response to congestion. Making the increasing and decreasing rates different tends to avoid oscillation in the transmission rate and improve the reactive control.

TABLE 1

Parameter Values For Automatic Rate Control Algorithm

Preset operation mode (for entire network)

Congestion_Indicator:

| | |
|---|---|
| 0 - Return_Cell | /* Congestion indicated by a return cell */ |
| 1 - Packet_Loss | /* Congestion indicated by packet loss */ |

Preset static control variable (for each virtual channel)

RC_Mode:

000 - Recovery_Value = $2^0$ = 1
001 - Recovery_Value = $2^1$ = 2
010 - Recovery_Value = $2^2$ = 4
011 - Recovery_Value = $2^3$ = 8
100 - Recovery_Value = $2^4$ = 16
101 - Disable_Recovery
110 - Disable_RateControl
111 - VirtualChannel_Shutdown TABLE 1-continued Parameter Values For Automatic Rate Control Algorithm State variables (for each virtual channel)

Cong_Level:

| | |
|---|---|
| 000 - normal | /* Full Rate_Queue Xmit_Rate */ |
| 001 - half | /* 1/2 Rate_Queue Xmit_Rate */ |
| 010 - quarter | /* 1/4 Rate_Queue Xmit_Rate */ |
| 011 - eighth | /* 1/8 Rate_Queue Xmit_Rate */ |
| 100 - sixteenth | /* 1/16 Rate_Queue Xmit_Rate */ |
| 101 - zero | /* no cell transmission */ |

RC_Inhibit:

0 - Inhibit_Inactive
1 - Inhibit_Active
Recovery_Count:
4-bit count

Incoming congestion signals

Cong_Signal:

| | |
|---|---|
| 0 - No_Cell_Waiting | /* No return cell waiting */ |
| 1 - Cell_Waiting | /* Return cell waiting for processing */ |

Cong_Signal_VCI:

| | |
|---|---|
| identifier | /* Virtual channel identifier of return cell, typically 10 to 16 bits */ |

Pkt_Loss_Signal:

| | |
|---|---|
| 0 - No_Signal_Waiting | /* No Pkt_Loss_Signal waiting */ |
| 1 - Signal_Waiting | /* Packet loss signal waiting for processing */ |

Pkt_Loss_VCI:

| | |
|---|---|
| identifier | /* Virtual channel identifier of waiting Pkt_Loss_Signal, 10 to 16 bits typical*/ |

Signals from timers (for each Rate_Queue)

Xmit_Time:

| | |
|---|---|
| 1 - Active | /* Time to service this Rate_Queue */ |
| 0 - Inactive | /* Not time to service this Rate_Queue */ |

X_count:

| | |
|---|---|
| 4-bit count | /* Count from X-counter */ |

TABLE 2

Automatic Rate Control Algorithm
© Copyright Adapative Corporation 1991

```
    /* Scheduler */
 1  REPEAT
 2      FOREACH Rate_Queue
 3          IF (Xmit_Time [Rate_Queue] = Active)
 4          THEN Service_Rate_Queue (Rate_Queue)
 5          ENDIF;
 6          Check_Cong_Signal;
 7      ENDFOREACH;
 8  ENDREPEAT;

/* Check for congestion signal waiting for processing */

11  PROCEDURE Check_Cong_Signal;
12      IF (Congestion_Indicator = Return_Cell)
13      THEN
14          IF (Cong_Signal = Cell_Waiting)
15          THEN Rate_Adjust (Cong_Signal_VCI);
16          ENDIF;
17      ELSE
18          IF (Pkt_Loss_Signal = Signal_Waiting)
19          THEN Rate_Adjust (Pkt_Loss_VCI);
20          ENDIF;
21      ENDIF;
22  ENDPROC;

/* Modify rate of identified virtual channel upon receiving congestion signal */

41  PROCEDURE Rate_Adjust (Virt_Chan);
42      READ for Virt_Chan (RC_Mode, RC_Inhibit, Recovery_Count, Cong_Level);
43      IF (RC_Mode != Disable_RateControl
44         AND (RC_Inhibit != Inhibit_Active)
45      THEN
46          IF (Cong_Level != zero)
47          THEN increment Cong_Level;
48          ENDIF;
49          RC_Inhibit := Inhibit_Active;
50          Recovery_Count := 0;
51      ENDIF;
52      WRITE for Virt_Chan (RC_Inhibit, Recovery_Count, Cong_Level);
53  ENDPROC;
```

TABLE 2-continued

Automatic Rate Control Algorithm
© Copyright Adapative Corporation 1991

```
     /* Service each virtual channel in rate queue */

61   PROCEDURE Service_Rate_Queue (Rate_Queue);
62       FOREACH Virt_Chan in Rate_Queue
63           READ for Virt_Chan (RC_Mode, RC_Inhibit, Recovery_Count, Cong_Level);

/* Xmit Cell Routine */

64           IF (RC_Mode != VC_Shutdown)
65           THEN
66               IF  (Cong_Level = normal)
67               OR (Cong_Level = half      AND Xcount [Rate_Queue] = ???1)
68               OR (Cong_Level = quarter   AND Xcount [Rate_Queue] = ??11)
69               OR (Cong_Level = eighth    AND Xcount [Rate_Queue] = ?111)
70               OR (Cong_Level = sixteenth AND Xcount [Rate_Queue] = 1111)
71               OR (Cong_Level = zero      AND Xcount [Rate_Queue] = 1111)
72               THEN
73                   IF (Cong_Level != zero)
74                   THEN Xmit_Cell (Virt_Chan);              /* Xmit next cell */
75                   ENDIF;
76                   RC_Inhibit := Inhibit_Inactive /* Xmit Rate Recovery Routine */

77               IF (RC_Mode != Disable_RateControl)
78               AND (RC_Mode != Disable_Recovery)
79               THEN
80                   IF (Recovery_Count = Recovery_Value)
81                   THEN
82                       IF (Cong_Level != normal)
83                       THEN decrement Cong_Level;
84                       ENDIF;
85                       Recovery_Count := 0;
86                   ELSE
87                       Increment Recovery_Count;
88                   ENDIF;
89               ENDIF;
90               WRITE for Virt_Chan (RC_Inhibit, Recovery_Count, Cong_Level);
91           ENDIF;
92       ENDIF;
93       Check_Cong_Signal;
94   ENDFOREACH;
95   ENDPROC;
```

TABLE 3

Sequenced Execution For Rate_Queue$_1$ And Virt_Chan$_1$

| | | |
|---|---|---|
| XR$_1$0 | | |
| | L1 | REPEAT |
| | L2 | FOREACH Rate_Queue |
| | L3 | IF (Xmit_Time [Rate_Queue$_1$] = Active) |
| | L4 | THEN Service_Rate_Queue (Rate_Queue$_1$) |
| | L61 | PROCEDURE Service_Rate_Queue (Rate_Queue$_1$); |
| | L62 | FOREACH Virt_Chan in Rate_Queue$_1$ |
| | L63 | READ Virt_Chan$_1$ (RC_Mode = 000, RC_Inhibit = 0, Recovery_Count =0000, Cong_Level =000); |
| | L64 | RC_Mode != VC_Shutdown |
| | L65 | THEN |
| | L66 | Cong_Level = normal |
| | L72 | THEN |
| | L73 | Cong_Level != zero |
| | L74 | Xmit_Cell (Virt_Chan$_1$) |
| | L75 | END |
| | L76 | RC_Inhibit := Inhibit_Inactive |
| | L77 | RC_Mode != Disable_RateControl |
| | L78 | RC_Mode != Disable_Recovery |
| | L79 | THEN |
| | L80 | Recovery_Count(0000) != Recovery_Value(0001) |
| | L86 | ELSE |
| | L87 | Increment Recovery_Count := 0001 |
| | L88 | END |
| | L89 | END |
| | L90 | WRITE for Virt_Chan$_1$ (RC_Inhibit = 0, Recovery_Count = 0001, Cong_Level = 000); |
| | L91 | END |
| | L92 | END |
| | L93 | Check_Cong_Signal |
| | L94 | END |
| | L95 | END |
| | L5 | END |
| | L6 | Check_Cong_Signal |
| | L7 | END |
| | L8 | END |
| XR$_1$0+ | | |
| | L1 | REPEAT |
| | L2 | FOREACH Rate_Queue |
| | L3 | IF (Xmit_Time [Rate_Queue$_1$] = Inactive) |

TABLE 3-continued

Sequenced Execution For Rate_Queue$_1$ And Virt_Chan$_1$

| | | |
|---|---|---|
| | L5 | END |
| | L6 | Check_Cong_Signal |
| | L7 | END |
| | L8 | END |
| XR$_1$0++ | | |
| | L1 | REPEAT |
| | L2 | FOREACH Rate_Queue |
| | L3 | IF (Xmit_Time [Rate_Queue$_1$] = Inactive) |
| | L5 | END |
| | L6 | Check_Cong_Signal |
| | L7 | END |
| | L8 | END |
| . | | |
| . | | |
| . | | |
| XR$_1$1 | | |
| | L1 | REPEAT |
| | L2 | FOREACH Rate_Queue |
| | L3 | IF (Xmit_Time [Rate_Queue$_1$] = Active) |
| | L4 | THEN Service_Rate_Queue (Rate_Queue$_1$) |
| | L61 | PROCEDURE Service_Rate_Queue (Rate_Queue$_1$); |
| | L62 | FOREACH Virt_Chan in Rate_Queue$_1$ |
| | L63 | READ Virt_Chan$_1$ (RC_Mode = 000, RC_Inhibit = 0, Recovery_Count =0001, Cong_Level =000); |
| | L64 | RC_Mode != VC_Shutdown |
| | L65 | THEN |
| | L66 | Cong_Level = normal |
| | L72 | THEN |
| | L73 | Cong_Level != zero |
| | L74 | Xmit_Cell (Virt_Chan$_1$) |
| | L75 | END |
| | L76 | RC_Inhibit := Inhibit_Inactive |
| | L77 | RC_Mode != Disable_RateControl |
| | L78 | RC_Mode != Disable_Recovery |
| | L79 | THEN |
| | L80 | Recovery_Count(0001) = Recovery_Value(0001) |
| | L81 | THEN |
| | L82 | Cong_Level = 000(normal) |
| | L84 | END |
| | L85 | Recovery_Count := 0000 |
| | L88 | END |
| | L89 | END |
| | L90 | WRITE for Virt_Chan$_1$ (RC_Inhibit = 0, Recovery_Count = 0000, Cong_Level = 000); |
| | L91 | END |
| | L92 | END |
| | L93 | Check_Cong_Signal |
| | L94 | END |
| | L95 | END |
| | L5 | END |
| | L6 | Check_Cong_Signal |
| | L7 | END |
| | L8 | END |
| XR$_1$1+ | | |
| | L1 | REPEAT |
| | L2 | FOREACH Rate_Queue |
| | L3 | IF (Xmit_Time [Rate_Queue$_1$] = Inactive) |
| | L5 | END |
| | L6 | Check_Cong_Signal |
| | L7 | END |
| | L8 | END |
| XR$_1$++ | | |
| . | | |
| . | | |
| . | | |
| XR$_1$2 | | |
| | L1 | |
| | L2 | |
| | L3 | |
| | L4 | |
| | L62 | |
| | L63 | READ Virt_Chan$_1$ (Recovery_Count =0000) |
| | L64 | |
| | L65 | |
| | L66 | |
| | L72 | |
| | L73 | |
| | L74 | Xmit_Cell (Virt_Chan$_1$) |
| | L75 | |
| | L76 | |
| | L77 | |
| | L78 | |
| | L79 | |
| | L80 | Recovery_Count(0000) != Recovery_Value(0001) |
| | L86 | ELSE |
| | L87 | Increment Recovery_Count := 0001 |
| | L88 | |
| | L89 | |
| | L90 | WRITE for Virt_Chan$_1$ (Recovery_Count = 0001); |
| | L91 | |
| | L92 | |
| | L93 | |
| | L94 | |
| | L95 | |
| | L5 | |
| | L6 | |
| | L7 | |
| | L8 | |
| XR$_1$2+ | | |
| | L1 | REPEAT |
| | L2 | FOREACH Rate_Queue |
| | L3 | IF (Xmit_Time [Rate_Queue$_1$] = Inactive) |
| | L5 | END |
| | L6 | Check_Cong_Signal |
| | L7 | END |
| | L8 | END |
| XR$_1$2++ | | |
| . | | |
| . | | |
| . | | |
| XR$_1$3 | | |
| | L1 | |
| | L2 | |
| | L3 | |
| | L4 | |
| | L6 | |
| | L6 | |
| | L63 | READ Virt_Chan$_1$ (Recovery_Count =0001); |
| | L64 | |
| | L65 | |
| | L66 | |
| | L72 | |
| | L73 | |
| | L74 | Xmit_Cell (Virt_Chan$_1$) |
| | L75 | |
| | L76 | |
| | L77 | |
| | L78 | |
| | L79 | |
| | L80 | |
| | L81 | |
| | L82 | |
| | L84 | |
| | L85 | Recovery_Count := 0000 |
| | L88 | |
| | L89 | |
| | L90 | WRITE for Virt_Chan$_1$ (Recovery_Count = 0000); |
| | L91 | |
| | L92 | |
| | L93 | Check_Cong_Signal |
| | L94 | |
| | L95 | |
| | L5 | |
| | L6 | Check_Cong_Signal |
| | L7 | |
| | L8 | |
| XR$_1$3+ | | |
| | L1 | REPEAT |
| | L2 | FOREACH Rate_Queue |
| | L3 | IF (Xmit_Time [Rate_Queue$_1$] = Inactive) |
| | L5 | END |
| | L6 | Check_Cong_Signal |
| | L7 | END |
| | L8 | END |

TABLE 3-continued

Sequenced Execution For Rate_Queue₁ And Virt_Chan₁

| | | |
|---|---|---|
| XR₁3++ | | |
| | L1 | REPEAT |
| | L2 | FOREACH Rate_Queue |
| | L3 | IF (Xmit_Time [Rate_Queue₁] = Inactive) |
| | L5 | END |
| | L6 | Check_Cong_Signal |
| | L11 | PROCEDURE Check_Cong_Signal |
| | L12 | Congestion_Indicator = Return_Cell |
| | L13 | THEN |
| | L14 | Cong_Signal = Cell_Waiting |
| | L15 | THEN Rate_Adjust (Cong_Signal_VCI₁) |
| | L41 | PROCEDURE Rate_Adjust (Virt_Chan₁) |
| | L42 | READ Virt_Chan₁ (RC_Mode = 000, RC_Inhibit = 0, Recovery_Count = 0000, Cong_Level =000); |
| | L43 | RC_Mode != Disable_RateControl |
| | L44 | RC_Inhibit != Inhibit_Active |
| | L45 | THEN |
| | L46 | Cong_Level != zero |
| | L47 | THEN increment Cong_Level to 001 (half) |
| | L48 | END |
| | L49 | RC_Inhibit := 1-Inhibit_Active; |
| | L50 | Recovery_Count := 0; |
| | L51 | END |
| | L52 | WRITE for Virt_Chan (RC_Inhibit = 1, Recovery_Count = 0000, Cong_Level = 001); |
| | L53 | ENDPROC |
| | L16 | END |
| | L21 | ENDIF |
| | L22 | ENDPROC |
| | L7 | END |
| | L8 | ENDREPEAT |
| XR₁3+++ | | |
| | L1 | REPEAT |
| | L2 | FOREACH Rate_Queue |
| | L3 | IF (Xmit_Time [Rate_Queue₁] = Inactive) |
| | L5 | END |
| | L6 | Check_Cong_Signal |
| | L7 | END |
| | L8 | END |
| . | | |
| . | | |
| . | | |
| XR₁4 | | |
| | L1 | REPEAT |
| | L2 | FOREACH Rate_Queue |
| | L3 | IF (Xmit_Time [Rate_Queue₁] = Active) |
| | L4 | THEN Service_Rate_Queue (Rate_Queue₁) |
| | L61 | PROCEDURE Service_Rate_Queue (Rate_Queue₁); |
| | L62 | FOREACH Virt_Chan in Rate_Queue₁ |
| | L63 | READ Virt_Chan₁ (RC_Mode = 000, RC_Inhibit = 1, Recovery_Count =0000, Cong_Level =001); |
| | L64 | RC_Mode != VC_Shutdown |
| | L65 | THEN |
| | L66 | IF |
| | L67 | OR Cong_Level = half AND Xcount = 1110 (!= ???1) |
| | L91 | END |
| | L92 | END |
| | L93 | Check_Cong_Signal |
| | L94 | END |
| | L95 | END |
| | L5 | END |
| | L6 | Check_Cong_Signal |
| | L7 | END |
| | L8 | END |
| XR₁4+ | | |
| | L1 | REPEAT |
| | L2 | FOREACH Rate_Queue |
| | L3 | IF (Xmit_Time [Rate_Queue₁] = Inactive) |
| | L5 | END |
| | L6 | Check_Cong_Signal |
| | L7 | END |
| | L8 | END |
| XR₁4++ | | |
| | L1 | REPEAT |
| | L2 | FOREACH Rate_Queue |
| | L3 | IF (Xmit_Time [Rate_Queue₁] = 0-Inactive) |

TABLE 3-continued

Sequenced Execution For Rate_Queue₁ And Virt_Chan₁

| | | |
|---|---|---|
| | L5 | END |
| | L6 | Check_Cong_Signal |
| | L7 | END |
| | L8 | END |
| . | | |
| . | | |
| . | | |
| XR₁5 | | |
| | L1 | REPEAT |
| | L2 | FOREACH Rate_Queue |
| | L3 | IF (Xmit_Time [Rate_Queue₁] = Active) |
| | L4 | THEN Service_Rate_Queue (Rate_Queue₁) |
| | L61 | PROCEDURE Service_Rate_Queue (Rate_Queue₁); |
| | L62 | FOREACH Virt_Chan in Rate_Queue₁ |
| | L63 | READ Virt_Chan₁ (RC_Mode = 000, RC_Inhibit = 1, Recovery_Count =0000, Cong_Level =001); |
| | L64 | RC_Mode != VC_Shutdown |
| | L65 | THEN |
| | L66 | IF |
| | L67 | OR Cong_Level = 001-half AND Xcount = 1111 (=???1) |
| | L72 | THEN |
| | L73 | Cong_Level != zero |
| | L74 | Xmit_Cell (Virt_Chan₁) |
| | L75 | END |
| | L76 | RC_Inhibit := 0-Inhibit_Inactive |
| | L77 | RC_Mode != Disable_RateControl |
| | L78 | RC_Mode != Disable_Recovery |
| | L79 | THEN |
| | L80 | Recovery_Count(0000 != Recovery_Value(0001) |
| | L86 | ELSE |
| | L87 | Increment Recovery_Count := 0001 |
| | L88 | END |
| | L89 | END |
| | L90 | WRITE for Virt_Chan₁ (RC_Inhibit = 0, Recovery_Count = 0001, Cong_Level = 001); |
| | L91 | END |
| | L92 | END |
| | L93 | Check_Cong_Signal |
| | L94 | END |
| | L95 | END |
| | L5 | END |
| | L6 | Check_Cong_Signal |
| | L7 | END |
| | L8 | END |
| XR₁5+ | | |
| | L1 | REPEAT |
| | L2 | FOREACH Rate_Queue |
| | L3 | IF (Xmit_Time [Rate_Queue₁] = Inactive) |
| | L5 | END |
| | L6 | Check_Cong_Signal |
| | L7 | END |
| | L8 | END |
| XR₁5++ | | |
| | L1 | REPEAT |
| | L2 | FOREACH Rate_Queue |
| | L3 | IF (Xmit_Time [Rate_Queue₁] = Inactive) |
| | L5 | END |
| | L6 | Check_Cong_Signal |
| | L11 | PROCEDURE Check_Cong_Signal |
| | L12 | Congestion_Indicator = Return_Cell |
| | L13 | THEN |
| | L14 | Cong_Signal = Cell_Waiting |
| | L15 | THEN Rate_Adjust (Cong_Signal_VCI₁) |
| | L41 | PROCEDURE Rate_Adjust (Virt_Chan₁) |
| | L42 | READ Virt_Chan₁ (RC_Mode = 000, RC_Inhibit = 0, Recovery_Count = 0000, Cong_Level =001); |
| | L43 | RC_Mode != Disable_RateControl |
| | L44 | RC_Inhibit != Inhibit_Active |
| | L45 | THEN |
| | L46 | Cong_Level != zero |
| | L47 | THEN increment Cong_Level to 010 (quarter) |
| | L48 | END |
| | L49 | RC_Inhibit := 1-Inhibit_Active; |
| | L50 | Recovery_Count := 0000; |
| | L51 | END |
| | L52 | WRITE for Virt_Chan (RC_Inhibit = 1, |

TABLE 3-continued

Sequenced Execution For Rate_Queue$_1$ And Virt_Chan$_1$

|  |  |  |
|---|---|---|
|  |  | Recovery_Count = 0000, Cong_Level = 010); |
|  | L53 | ENDPROC |
|  | L16 | END |
|  | L21 | ENDIF |
|  | L22 | ENDPROC |
|  | L7 | END |
|  | L8 | ENDREPEAT |
| XR$_1$5+++ |  |  |
|  | L1 | REPEAT |
|  | L2 | FOREACH Rate_Queue |
|  | L3 | IF (Xmit_Time [Rate_Queue$_1$] = Inactive) |
|  | L5 | END |
|  | L6 | Check_Cong_Signal |
|  | L7 | END |
|  | L8 | END |
| . |  |  |
| . |  |  |
| . |  |  |
| XR$_1$6 |  |  |
|  | L1 | REPEAT |
|  | L2 | FOREACH Rate_Queue |
|  | L3 | IF (Xmit_Time [Rate_Queue$_1$] = Active) |
|  | L4 | THEN Service_Rate_Queue (Rate_Queue$_1$) |
|  | L61 | PROCEDURE Service_Rate_Queue (Rate_Queue$_1$); |
|  | L62 | FOREACH Virt_Chan in Rate_Queue$_1$ |
|  | L63 | READ Virt_Chan$_1$ (RC_Mode = 000, RC_Inhibit = 1, Recovery_Count =0000, Cong_Level =010); |
|  | L64 | RC_Mode != VC_Shutdown |
|  | L65 | THEN |
|  | L66 | IF |
|  | L68 | OR Cong_Level = 010-quarter AND Xcount = 0000 (!= ??11) |
|  | L91 | END |
|  | L92 | END |
|  | L93 | Check_Cong_Signal |
|  | L94 | END |
|  | L95 | END |
|  | L5 | END |
|  | L6 | Check_Cong_Signal |
|  | L7 | END |
|  | L8 | END |
| XR$_1$6+ |  |  |
|  | L1 | REPEAT |
|  | L2 | FOREACH Rate_Queue |
|  | L3 | IF (Xmit_Time [Rate_Queue$_1$] = Inactive) |
|  | L5 | END |
|  | L6 | Check_Cong_Signal |
|  | L7 | END |
|  | L8 | END |
| XR$_1$6++ |  |  |
|  | L1 | REPEAT |
|  | L2 | FOREACH Rate_Queue |
|  | L3 | IF (Xmit_Time [Rate_Queue$_1$] = Inactive) |
|  | L5 | END |
|  | L6 | Check_Cong_Signal |
|  | L7 | END |
|  | L8 | END |
| . |  |  |
| . |  |  |
| . |  |  |
| XR$_1$7 |  |  |
| . |  |  |
| . |  |  |
| . |  |  |
|  | L68 | OR Cong_Level = 010-quarter AND Xcount = 0001 (!= ??11) |
| . |  |  |
| . |  |  |
| . |  |  |
| XR$_1$8 |  |  |
| . |  |  |
| . |  |  |
| . |  |  |
|  | L68 | OR Cong_Level = 010-quarter AND Xcount = 0010 (!= ??11) |
| . |  |  |
| . |  |  |
| . |  |  |
| XR$_1$9 |  |  |
|  | L1 | REPEAT |
|  | L2 | FOREACH Rate_Queue |

TABLE 3-continued

Sequenced Execution For Rate_Queue$_1$ And Virt_Chan$_1$

|  |  |  |
|---|---|---|
|  | L3 | IF (Xmit_Time [Rate_Queue$_1$] = Active) |
|  | L4 | THEN Service_Rate_Queue (Rate_Queue$_1$) |
|  | L61 | PROCEDURE Service_Rate_Queue (Rate_Queue$_1$); |
|  | L62 | FOREACH Virt_Chan in Rate_Queue$_1$ |
|  | L63 | READ Virt_Chan$_1$ (RC_Mode = 000, RC_Inhibit = 1, Recovery_Count =0000, Cong_Level =010); |
|  | L64 | RC_Mode != VC_Shutdown |
|  | L65 | THEN |
|  | L66 | IF |
|  | L67 | OR Cong_Level = 010-quarter AND Xcount = 0011 (=??11) |
|  | L72 | THEN |
|  | L73 | Cong_Level != zero |
|  | L74 | Xmit_Cell (Virt_Chan$_1$) |
|  | L75 | END |
|  | L76 | RC_Inhibit := 0-Inhibit_Inactive |
|  | L77 | RC_Mode != Disable_RateControl |
|  | L78 | RC_Mode != Disable_Recovery |
|  | L79 | THEN |
|  | L80 | Recovery_Count(0000 != Recovery_Value(0001) |
|  | L86 | ELSE |
|  | L87 | Increment Recovery_Count := 0001 |
|  | L88 | END |
|  | L89 | END |
|  | L90 | WRITE for Virt_Chan$_1$ (RC_Inhibit = 0, Recovery_Count = 0001, Cong_Level = 010); |
|  | L91 | END |
|  | L92 | END |
|  | L93 | Check_Cong_Signal |
|  | L94 | END |
|  | L95 | END |
|  | L5 | END |
|  | L6 | Check_Cong_Signal |
|  | L7 | END |
|  | L8 | END |
| XR$_1$9+ |  |  |
|  | L1 | REPEAT |
|  | L2 | FOREACH Rate_Queue |
|  | L3 | IF (Xmit_Time [Rate_Queue$_1$] = Inactive) |
|  | L5 | END |
|  | L6 | Check_Cong_Signal |
|  | L7 | END |
|  | L8 | END |
| XR$_1$9++ |  |  |
|  | L1 | REPEAT |
|  | L2 | FOREACH Rate_Queue |
|  | L3 | IF (Xmit_Time [Rate_Queue$_1$] = Inactive) |
|  | L5 | END |
|  | L6 | Check_Cong_Signal |
|  | L11 | PROCEDURE Check_Cong_Signal |
|  | L12 | Congestion_Indicator = Return_Cell |
|  | L13 | THEN |
|  | L14 | Cong_Signal = Cell_Waiting |
|  | L15 | THEN Rate_Adjust (Cong_Signal_VCI$_1$) |
|  | L41 | PROCEDURE Rate_Adjust (Virt_Chan$_1$) |
|  | L42 | READ Virt_Chan$_1$ (RC_Mode = 000, RC_Inhibit = 0, Recovery_Count = 0000, Cong_Level =010); |
|  | L43 | RC_Mode != Disable_RateControl |
|  | L44 | RC_Inhibit != Inhibit_Active |
|  | L45 | THEN |
|  | L46 | Cong_Level != zero |
|  | L47 | THEN increment Cong_Level to 011 (eighth) |
|  | L48 | END |
|  | L49 | RC_Inhibit := 1-Inhibit_Active |
|  | L50 | Recovery_Count := 0000 |
|  | L51 | END |
|  | L52 | WRITE Virt_Chan$_1$ (RC_Inhibit = 1, Recovery_Count = 0000, Cong_Level = 011); |
|  | L53 | ENDPROC |
|  | L16 | END |
|  | L21 | ENDIF |
|  | L22 | ENDPROC |
|  | L7 | END |
|  | L8 | ENDREPEAT |
| XR$_1$9+++ |  |  |
|  | L1 | REPEAT |
|  | L2 | FOREACH Rate_Queue |

TABLE 3-continued

Sequenced Execution For Rate_Queue$_1$ And Virt_Chan$_1$

|  |  |  |
|---|---|---|
|  | L3 | IF (Xmit_Time [Rate_Queue$_1$] = Inactive) |
|  | L5 | END |
|  | L6 | Check_Cong_Signal |
|  | L7 | END |
|  | L8 | END |
| . |  |  |
| . |  |  |
| . |  |  |
| XR$_1$10 |  |  |
| . |  |  |
|  | L69 | OR Cong_Level = 011-eighth AND Xcount = 0100 (!= ?111) |
| . |  |  |
| XR$_1$11 |  |  |
| . |  |  |
|  | L69 | OR Cong_Level = 011-eighth AND Xcount = 0101 (!= ?111) |
| . |  |  |
| XR$_1$12 |  |  |
| . |  |  |
|  | L69 | OR Cong_Level = 011-eighth AND Xcount = 0110 (!= ?111) |
| . |  |  |
| XR$_1$13 |  |  |
| . |  |  |
|  | L69 | OR Cong_Level = 011-eighth AND Xcount = 0111 (= ?111) |
|  | L74 | Xmit_Cell (Virt_Chan$_1$) |
|  | L87 | Increment Recovery_Count := 0001 |
| . |  |  |
| XR$_1$14 |  |  |
| . |  |  |
|  | L69 | OR Cong_Level = 011-eighth AND Xcount = 1000 (= ?111) |
| . |  |  |
| XR$_1$15 |  |  |
| . |  |  |
|  | L69 | OR Cong_Level = 011-eighth AND Xcount = 1001 (= ?111) |
| . |  |  |
| XR$_1$16 |  |  |
| XR$_1$17 |  |  |
| XR$_1$18 |  |  |
| XR$_1$19 |  |  |
| XR$_1$20 |  |  |
| . |  |  |
|  | L69 | OR Cong_Level = 011-eighth AND Xcount = 1110 (= ?111) |
| . |  |  |
| XR$_1$21 |  |  |
| . |  |  |
|  | L69 | OR Cong_Level = 011-eighth AND Xcount = 1111 (= ?111) |
|  | L74 | Xmit_Cell (Virt_Chan$_1$) |
| . |  |  |
|  | L80 | Recovery_Count(0001 = Recovery_Value(0001) |
|  | L81 | THEN |
|  | L82 | Cong_Level = 011 (!= normal) |
|  | L83 | THEN decrement Cong_Level := 010-quarter |
|  | L84 | END |
|  | L85 | Recovery_Count := 0000 |
|  | L88 | END |
|  | L89 | END |
|  | L90 | WRITE for Virt_Chan$_1$ (RC_Inhibit = 0, Recovery_Count = 0000), Cong_Level = 010; |
|  | L91 | END |
|  | L92 | END |
|  | L93 | Check_Cong_Signal |
|  | L94 | END |
|  | L95 | END |
|  | L5 | END |
|  | L6 | Check_Cong_Signal |
|  | L7 | END |
|  | L8 | END |
| XR$_1$22 |  |  |
| . |  |  |
|  | L68 | OR Cong_Level = 010-quarter AND Xcount = 0000 (!= ??11) |
| . |  |  |
| XR$_1$25 |  |  |
| . |  |  |
|  | L68 | OR Cong_Level = 010-quarter AND Xcount = 0011 (= ??11) |
|  | L74 | Xmit_Cell (Virt_Chan$_1$) |
|  | L87 | Increment Recovery_Count := 0001 |
| . |  |  |
| XR$_1$26 |  |  |
| XR$_1$27 |  |  |
| XR$_1$28 |  |  |
| XR$_1$29 |  |  |
| . |  |  |
|  | L68 | OR Cong_Level = 010-quarter AND Xcount = 0111 (= ?111) |
|  | L74 | Xmit_Cell (Virt_Chan$_1$) |
| . |  |  |
|  | L80 | Recovery_Count(0001 = Recovery_Value(0001) |
|  | L81 | THEN |
|  | L82 | Cong_Level = 010 (!= normal) |
|  | L83 | THEN decrement Cong_Level := 001-half |
|  | L84 | END |
|  | L85 | Recovery_Count := 0000 |
|  | L88 | END |
|  | L89 | END |
|  | L90 | WRITE for Virt_Chan$_1$ (RC_Inhibit = 0, Recovery_Count = 0000, Cong_Level = 001) |
|  | L91 | END |
|  | L92 | END |
|  | L93 | Check_Cong_Signal |
|  | L94 | END |
|  | L95 | END |
|  | L5 | END |
|  | L6 | Check_Cong_Signal |
|  | L7 | END |
|  | L8 | END |

The overall network operation, using variable rate sources of the type described, is characterized using the following terms.

"Bit" is a binary unit of information.

"Byte" is a fixed number of bits, typically 8 bits.

"Packet" is a communication message formed of bytes, typically of variable length from 40 to 10,000 bytes.

"Cell" is a fixed length communication message formed of bytes, typically 53 bytes (5 byte header/48 byte data).

"Bit Rate" (BiR) is rate at which a communication system transmits bits.

"Byte Rate" (ByR) is rate at which a communication system transmits bytes.

"Cell rate" (CR) is rate at which a communication system transmits cells.

"Cell Interval" (CI) is period from one cell to the next cell.

"Channel Cell Interval" (CCI) is the cell interval for a virtual channel transmitting at the Channel Peak Cell Rate.

"Maximum Channel Peak Cell Rate" (MCPCR) is the cell rate assigned to a particular channel in the absence of congestion.

"Current Channel Peak Cell Rate" (CCPCR) is the current cell rate at a particular time for a virtual channel and may equal the Maximum Channel Peak Cell Rate in the absence of congestion and may be less than the Maximum Channel Peak Cell Rate when congestion is present.

"Communication Interval" (CI) is a time period in a network, typically measured as a number of cell intervals.

"Average Cell Rate" (ACR) is the average number of cells transmitted over a communication interval in a virtual channel.

"Cell Transmission Interval" (CTI) is the average period of time for a cell to travel from one location in a network to another location in the network.

"Modification Interval" (MI) is the period of time required to modify a communication parameter.

Wide-Area Network Formed By Plural Local Networks

In FIG. 9, a wide-area communication system employing networks of the FIG. 1 type is shown. The FIG. 9 system is comprised of a group of generally local communication systems including the networks 1-0, 1-1, . . . , 1-(L-1). Each of the local networks of FIG. 9 includes source and destination units of the type previously described in connection with the FIG. 1 network. Specifically, local communication systems are formed by the local network 1-0 together with the local source/destination (SID) units 4(0,0), . . . , 4(0,S$_0$-1), the local network 1-1 together with the local the S/D units 4(1,0), . . . , 4(1,S$_1$,-l), and the local network 1-2 together with the local SID units 4(2,0), . . . , 4(2,S$_2$-1) and the local network 1-(L-1) together with the local the SID units 4(L-1, S$_{L-1}$-1).

In FIG. 9, the wide-area system includes a wide-area source 4-0 connected to local network 1-0 and a wide-area destination 4'-(L-1) connected to local network 1-(L-1).

In FIG. 9, the local networks 1 are connected together by links 8 and specifically link 8(0,1) connects local networks 1-0 and 1-1, link 8(1,2) connects local networks 1-1 and 1-2 and so on such that local network 1-(L-1) is connected through links 8 and local networks to local network 1-0. In this manner, wide-area source 4-0 is connected to wide-area destination 4'-(L-1). The wide-area SID units 4-0 and 4'-(L-1) are typical of many such units which, for clarity, are not shown in FIG. 9.

In FIG. 9, the links 8(0,1), 8(1,2), 8(2,__), . . . , 8(__,L-1) between local networks are the same as the links 8 between local SID units except that they are typically longer in length.

In FIG. 9, a plurality of virtual channels are established between wide-area S/D units and local S/D units. Accordingly, a virtual channel is established, for example, between S/D unit 4-0 and SID unit 4'-(L-1).

In the operation of the FIG. 1 network as previously described in connection with FIG. 10 and TABLES 1 through 3, it was assumed that the cell transmission interval (CTI) was short. This short cell transition interval was evident since the transmitted cell at $XR_13$ resulted in a congestion signal, $Cong\_Signal_1$ at a time $XR_13+$, only a short time after the cell was transmitted. Accordingly, the forward transmission of the cell at $XR_1$'originated with reference to FIG. 3 at the source 4-(S) and was transmitted into the network along the virtual channel of FIG. 3 possibly as far as the node 5-(C-1) or the destination 4(D). When the congestion was encountered, a return cell was transmitted along the return path 8-R so as to arrive back at the source 4-(S) in a fraction of a Channel Cell Interval (CCI). In FIG. 10, for virtual channel 1, the CCI interval is the interval between each $Xmit\_Rate_1$ time, for example, between $XR_1 0$ and $XR_1 1$. Accordingly, the reactive control operation in reducing the transmission rate in the FIG. 10 example was very fast.

In FIG. 10, the return transmission interval for a congestion signal returning from a congested node to the source is short and in particular is less than a single CCI as measured from the time that the original cell was transmitted from the source in the forward direction. The return transmission interval, therefore, includes both the forward path delay (from the source to the node having congestion) and the return path delay (from the node having congestion back to the source). Also included within the return transmission interval is the delay resulting from the return cell processing time required for converting forward cells to return cells and processing the return cells.

While the FIG. 10 example had a return transmission interval of less than one CCI, return transmission intervals of less than approximately 10 CCI are still considered short so that the issue rate unit can reactively modify the transmission rate and thereby reduce congestion.

In order to keep the return transmission interval short, the return cell processing time must also be kept short and is desireable much less than the return transmission interval.

In the FIG. 9 system, it is contemplated that the distance between the local network 1-0, for example, and the local network 1-(L-1) may be very far so that the delay time that may be encountered by a source 4-0 associated with network 1-0 in cell transmissions to a destination, for example, 4'-(L-1) associated with a network 1-(L-1) may be much longer than a Channel Cell Interval. The longer the transmission time from a source to a destination and the return time from the destination back to the source, the less effective becomes the reactive control mechanism of the present invention. If all communications in a very long network were only from the source at one end of the network to a destination at the far end of the network, then the effectiveness of the present invention for very long distance networks is reduced. However, experience indicates that a large percentage (for example, 80%) of data traffic in a large network tends to be local and not the full long distance of the network. For example, if the traffic for the network 1-0 between the SID units 4(0,0), . . . , 4(0,S$_0$-1) is principally local, then the reactive control mechanism of the present invention is effective for controlling the congestion by controlling the transmission issue rate of the local sources for the network 1-0. Similarly, for each of the other local networks such as networks 1-1 and 1-2 of FIG. 9, the local traffic in each of those networks is controlled by controlling the issue rate and the sources for local traffic in those networks. Since the entire network of FIG. 9 is composed by groups of local networks and each local network is effective to control congestion by controlling the local traffic issue rates, congestion is effectively controlled for the entire network of FIG. 9.

As discussed in connection with FIG. 7, different priorities can be given to traffic. For example, long distance traffic can be allocated to the queue 73 so that it has higher priority than local traffic allocated to the queue 69. By selecting a balance between local traffic which can effectively be controlled by the congestion control mechanism of the present invention and longer distance traffic, congestion is effectively controlled for the entire network.

Further and Other Embodiments

In FIGS. 5 through 7, a number of different queues (such as queues 52, 54, 55, 57, 61, 62, 69, 70, 73 or others) are used for queuing cells. These queues perform a number of functions and are, among other things, congestion signal generating means for generating congestion signals in response to congestion in the nodes. The signals Ql (queue level) and N-EMT (not empty) are examples disclosed. The Ql signal may include multiple signals such as 9/10-full, 3/4-full and 1/2-full. In such a case, the selectors (for example, 50 and 53 in FIG. 5) include the Ql value to marker 49 with the return cell. Marker 49 includes the Ql value in a field in the return cell to mark the return cell as a return cell and also to designate the level of congestion being experienced by the node. The more full the queue, the more congested the node. If any particular queue is less full than some value (for example, 1/2-full), such condition is defined to be an absence of congestion. In such case, no cell is returned and, therefore, there is an absence of congestion signals.

When multi-level congestion signals are returned in return cells, the algorithm of Table 2 is modified to respond to those levels. For example, the rate of increasing or decreasing the transmission rate is varied as a function of the congestion signal level returned.

In the embodiments of FIGS. 5 through 7, the various different queues are shown as distributed queues at different locations in the circuitry. However, such queues are preferable implemented together in a common random access memory (RAM). In RAM memory, the different queues are allocated different addresses and function in the same manner as the distributed queues described.

In the embodiment of FIG. 7, four queues (queues 57, 69, 70, 73) of different types are connected in parallel to feed the ourput link 18-OO through selector 71. The link 18-OO services the forward paths for some virtual channels and the retun paths for some other virtual channels.

While FIG. 7 depicts four queues in parallel, any number of queues can be connected in parallel and such connection is readily implemented with queues in a common RAM memory.

With parallel queues, the selectors (like selectors 67 and 71 in FIG. 7) select cells from the queues based upon some determined priority.

Each selector determines priority among queues. For example, for a four-way selector (like selector 71 in FIG. 7) priority is granted in some predefined order such as queue 57, queue 70, queue 73 and queue 69 because selector 71 grants priority in that order to the N-EMT signals (queue level) signals. When a larger number of queues is made available, for example, using common RAM memory, priority is indicated among queues using well-known means.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A communication system having reactive congestion control comprising, a plurality of sources, each source including a modifiable issue rate unit which transmits forward information signals at different transmission rates in response to congestion signals, said issue rate unit decreasing the transmission rate in response to congestion signals, a plurality of destinations, one or more nodes forming an asynchronous transfer mode (ATM) network connecting the sources to the destinations, each node including, a forward path for transfer of information in a forward direction toward a destination through the network, a return path for returning congestion signals in a reverse direction through the network toward a source, congestion signal generating means for generating congestion signals in response to congestion in the node, said network having a plurality of virtual channels where, for each virtual channel, one of said plurality of sources is linked to one of said plurality of destinations through said network by linking forward paths from one or more nodes, and wherein said issue rate unit transmits forward information signals at different transmission rates in response to congestion signals over the virtual channel, said one of said plurality of destinations is linked to said one of said plurality of sources through said network by linking return paths from said one or more nodes, the congestion signal generating means in one of said nodes generates said congestion signals for the virtual channel in response to congestion in said one of said nodes and transmits said congestion signals, in the reverse direction without need for propagation to said one of said plurality of destinations. over said return paths to said modifiable issue rate unit in said source.

2. The communication system of claim 1 wherein said issue rate unit increases the transmission rate in response to the absence of congestion signals.

3. The communication system of claim 1 wherein the transmission interval for a congestion signal returning from a congested node to the source is less than the interval between information signals transmitted over the virtual channel whereby the issue rate unit reactively responds to modify the transmission rate to reduce congestion.

4. The communication system of claim 1 wherein the transmission interval for a congestion signal returning from a congested node to the source is less than ten intervals between information signals transmitted over the virtual channel whereby the issue rate unit reactively responds to modify the transmission rate to reduce congestion.

5. The communication system of claim 1 wherein the processing time required to generate a congestion signal at each node is much less than the transmission interval for a congestion signal returning from a congested node to the source.

6. The communication system of claim 1 wherein said issue rate unit has means for decreasing said transmission rate exponentially in response to a congestion signal.

7. The communication system of claim 6 wherein said issue rate unit, after decreasing said transmission rate, has means for increasing said transmission rate exponentially in response to the absence of a congestion signal.

8. The communication system of claim 7 wherein the rate of increasing said transmission rate is less than the rate of decreasing said transmission rate.

9. The communication system of claim 1 wherein said forward information is fragmented into cells, each cell including a virtual channel identifier, and wherein each node includes a switching element, each switching element including, a switch fabric, a plurality of port controllers interconnected by said switch fabric, each of said port controllers including, an input controller, an output controller, congestion detection means for detecting congestion in the node, reversing means for copying a cell, having a virtual channel identifier, from the forward path to the return path to thereby generate a congestion signal on said return path.

10. The communication system of claim 9 wherein said reversing means includes reverse marker means for marking copied cells with a return path indicator whereby return cells are distinguished from forward cells.

11. The communication system of claim 9 wherein each of said port controllers includes selector means for selecting cells from one virtual channel for the forward path or from another virtual channel for the return path.

12. The communication system of claim 11 wherein said selector means grants priority to cells from the return path whereby congestion signals are given priority in the network.

13. The communication system of claim 9 wherein said forward paths include queues for storing cells in the forward direction, each of said queues including means for providing a queue-level signal, as a function of the fullness of the queue, to form the congestion signal.

14. The communication system of claim 1 wherein said forward information is fragmented into cells, each cell including a virtual channel identifier, and wherein each node includes a switching element, each switching element including, a switch fabric, a plurality of port controllers interconnected by said switch fabric, each port controller connected to a communication link and each port controller including, an input controller for said link including a translator for receiving the virtual channel identifier of incoming cells on the link and responsively translating the input virtual channel identifier of incoming cells to an output virtual channel identifier of outgoing cells for another link for another port controller connected to said switch fabric, an output controller for said link, congestion detection means for detecting congestion in the node, reversing means for copying a cell, having a virtual channel identifier, from the forward path to the return path to thereby generate a congestion signal on said return path, said reversing means connecting said output virtual channel identifier to be reverse translated to said input virtual channel identifier whereby the virtual channel identifiers for cells in the forward path and in the return path over the link are the same.

15. The communication system of claim 14 wherein said port controller includes one or more queues connected in parallel for queueing cells for the forward path and the return path of a link, said queues providing queue-level signals indicating the fullness of the queues and including selection means for selecting cells from said queues.

16. The communication system of claim 15 wherein said selector means grants priority to cells from the return path whereby congestion signals are given priority in the network.

17. The communication system of claim 14 wherein said reversing means includes reverse marker means for marking copied cells with a return path indicator whereby return cells are distinguished from forward cells.

18. The communication system of claim 14 wherein each of said port controllers includes selector means for selecting cells from one virtual channel for the forward path or from another virtual channel for the return path.

19. The communication system of claim 14 wherein said selector means grants priority to cells from the return path whereby congestion signals are given priority in the network.

20. The communication system of claim 14 wherein said forward paths include queues for storing cells in the forward direction, each of said queues including means for providing a queue-level signal, as a function of the fullness of the queue, to form the congestion signal.

21. A wide-area communication system having local reactive congestion control comprising, a plurality of local communication systems, each local communication system including, a plurality of local sources, each local source including a local modifiable issue rate unit which transmits forward information signals at different transmission rates, said issue rate unit decreasing the transmission rate in response to the presence of congestion signals and increasing the transmission rate in response to the absence of congestion signals, a plurality of local destinations, one or more local nodes forming an asynchronous transfer mode (ATM) local network connecting the sources to the destinations, each local node including, a forward path for transfer of information at different selectable transmission rates in a forward direction toward a destination through the network, a return path for returning congestion signals in a reverse direction through the network toward a source, congestion signal generating means for generating congestion signals in response to congestion in the local node, said network having a plurality of virtual channels where, for each virtual channel, one of said plurality of local sources is linked to one of said plurality of local destinations through said local network by linking forward paths from one or more local nodes, and wherein said issue rate unit transmits forward information signals at different transmission rates in response to congestion signals over the virtual channel, said one of said plurality of local destinations is linked to said one of said plurality of local sources through said network by linking return paths from said one or more nodes, the congestion signal generating means in one of said local nodes generates said congestion signals for the virtual channel in response to congestion in said one of said local nodes and transmits said congestion signals over said return paths, in the reverse direction without need for propagation to said one of said plurality of destinations, to said local modifiable issue rate unit in said source, one or more wide-area sources connected to one of said local networks, one or more wide-area destinations connected to another one of said local networks, a plurality of local network links interconnecting two or more local networks to form a wide-area network, said wide-area network having a plurality of virtual channels where, for each virtual channel, one of said plurality of wide-area sources is linked to one of said plurality of wide-area destinations through a plurality of said local networks over said local networks and said local network links.

22. The wide-area communication system of claim 21 wherein the transmission interval for a congestion signal returning from a congested local node to the local source is short thereby enabling the issue rate unit to reactively modify the transmission rate and thereby reduce congestion in the wide-area communication system.

23. The wide-area communication system of claim 21 wherein the transmission interval for a congestion signal returning from a congested local node to the local source is less than the interval between information signals transmitted over the virtual channel whereby the issue rate unit reactively responds to modify the transmission rate to reduce congestion in the wide-area communication system.

24. The wide-area communication system of claim 21 wherein the transmission interval for a congestion signal returning from a congested local node to the local source is less than ten intervals between information signals transmitted over the virtual channel whereby the issue rate unit reactively responds to modify the transmission rate to reduce congestion in the wide-area communication system.

25. The wide-area communication system of claim 21 wherein the processing time required to generate a congestion signal at each node is much less than said transmission interval for a congestion signal.

26. The wide-area communication system of claim 21 wherein said issue rate unit has means for decreasing said transmission rate exponentially in response to a congestion signal.

27. The wide-area communication system of claim 26 wherein said issue rate unit, after decreasing said transmission rate, has means for increasing said transmission rate exponentially in response to the absence of a congestion signal.

28. The wide-area communication system of claim 27 wherein the rate of increasing said transmission rate is less than the rate of decreasing said transmission rate.

29. The wide-area communication system of claim 21 wherein said forward information is fragmented into cells, each cell including a virtual channel identifier, and wherein each node includes a switching element, each switching element including,
  a switch fabric,
  a plurality of port controllers interconnected by said switch fabric, each of said port controllers including,
    an input controller,
    and an output controller,
    congestion detection means for detecting congestion in the node,
    reversing means for copying a cell, having a virtual channel identifier, from the forward path to the return path to thereby generate a congestion signal on said return path.

30. The wide-area communication system of claim 29 wherein said reversing means includes reverse marker means for marking copied cells with a return path indicator whereby return cells can be distinguished from forward cells.

31. The wide-area communication system of claim 29 wherein each of said port controllers includes selector means for selecting cells from one virtual channel for the forward path or from another virtual channel for the return path.

32. The wide-area communication system of claim 31 wherein said selector means grants priority to cells from the return path whereby congestion signals are given priority in the network.

33. The wide-area communication system of claim 29 wherein said forward paths include queues for storing cells in the forward direction, each of said queues including means for providing a queue-level signal, as a function of the fullness of the queue, to form the congestion signal in response to the queue-level signal.

34. The wide-area communication system of claim 21 wherein said forward information is fragmented into cells, each cell including a virtual channel identifier, and wherein each node includes a switching element, each switching element including,
  a switch fabric,
  a plurality of port controllers interconnected by said switch fabric, each port controller connected to a communication link and each port controller including,
    an input controller for said link including a translator for receiving the virtual channel identifier of incoming cells on the link and responsively translating the input virtual channel identifier of incoming cells to an output virtual channel identifier of outgoing cells for another link for another port controller connected to said switch fabric,
    an output controller for said link,
    congestion detection means for detecting congestion in the node,
    reversing means for copying a cell, having a virtual channel identifier, from the forward path to the return path to thereby generate a congestion signal on said return path, said reversing means connecting said output virtual channel identifier to be reverse translated to said input virtual channel identifier whereby the virtual channel identifiers for cells in the forward path and in the return path over the link are the same.

35. The wide-area communication system of claim 34 wherein said port controller includes one or more queues connected in parallel for queueing cells for the forward path and the return path of a link, said queues providing queue-level signals indicating the fullness of the queues and including selection means for selecting cells from said queues.

36. The wide-area communication system of claim 35 wherein said selector means grants priority to cells from the return path whereby congestion signals are given priority in the network.

37. The wide-area communication system of claim 34 wherein said reversing means includes reverse marker means for marking copied cells with a return path indicator whereby return cells can be distinguished from forward cells.

38. The wide-area communication system of claim 34 wherein each of said port controllers includes selector means for selecting cells from one virtual channel for the forward path or from another virtual channel for the return path.

39. The wide-area communication system of claim 34 wherein said selector means grants priority to cells from the return path whereby congestion signals are given priority in the network.

40. The wide-area communication system of claim 34 wherein said forward paths include queues for storing cells in the forward direction, each of said queues including means for providing a queue-level signal, as a function of the fullness of the queue, to form the congestion signal in response to the queue-level signal.

41. A communication system of one or more virtual channels having reactive congestion control comprising,
  a plurality of sources, each source including a modifiable issue rate unit which transmits forward information signals at different transmission rates in response to congestion signals, said issue rate unit transmitting, for each of one or more channels, at a maximum-channel-peak-cell-rate in the absence of congestion and at a rate below the maximum-channel-peak-cell-rate for each channel experiencing congestion, a plurality of destinations, one or more nodes forming an asynchronous transfer mode (ATM) network connecting sources to destinations, each node including, a forward path for transfer of information in a forward direction toward a destination through the network, a return path for returning congestion signals in a reverse direction through the network toward a source, congestion signal generating means for generating congestion signals in response to congestion in the node, for each of one or more virtual channels in the network, one of said plurality of sources is linked to one of said plurality of destinations through said network by linking forward paths from one nodes, and wherein said issue rate unit transmits forward information signals at different transmission rates in response to congestion signals over the virtual channel, said one of said plurality of destinations is linked to said one of said plurality of sources through said network by linking return paths from said one or more nodes, the congestion signal generating means in one of said nodes generates said congestion signals for the virtual channel in response to congestion in said one of said nodes and transmits said congestion signals over said return paths, in the reverse direction without need for propagation to said one of said plurality of destinations, to said modifiable issue rate unit in said source.

42. A multiple issue rate source for use in a communication system of one or more virtual channels having reactive control where said system includes, one or more of said multiple issue rate sources, a plurality of destinations, one or more nodes forming an asynchronous transfer mode (ATM) network connecting sources to destinations, each node including, a forward path for transfer of information in a forward direction toward a destination through the network, a return path for returning control signals in a reverse direction through the network toward a source, control signal generating means for generating control signals in response to congestion in the node, for each of one or more virtual channels in the network, one of said plurality of sources is linked to one of said plurality of destinations through said network by linking forward paths from one or more nodes, said one of said plurality of destinations is linked to said one of said plurality of sources through said network by linking return paths from said one or more nodes, the control signal generating means in one of said nodes generates said control signals for the virtual channel in response to congestion in said one of said nodes and transmits said congestion signals over said return paths to said modifiable issue rate unit in said source, said multiple issue rate source comprising, a modifiable issue rate unit having means to transmit forward information signals at different transmission rates in response to said control signals, said issue rate unit having an output for transmitting, for each of one or more virtual channels, at a maximum-channel-peak-cell-rate in the absence of a control signal and at a rate below the maximum-channel-peak-cell-rate for each channel providing a control signal.

43. The multiple issue rate source of claim 42 wherein said issue rate unit includes means for increasing the transmission rate, after decreasing said transmission rate, in response to the absence of control signals.

44. The multiple issue rate source of claim 42 wherein said issue rate unit has means for decreasing said transmission rate exponentially in response to a control signal.

45. The multiple issue rate source of claim 42 wherein said issue rate unit, after decreasing said transmission rate, has means for increasing said transmission rate exponentially in response to the absence of a control signal.

46. The multiple issue rate source of claim 45 wherein the rate of increasing said transmission rate is less than the rate of decreasing said transmission rate.

47. A multiple issue rate source for use in a communication system where the communication system has one or more multiple issue rate sources connected through one or more channels to a plurality of destinations and has control signal generating means for generating control signals for the channels for reactively controlling the transmission rates over the channels, said multiple issue rate source comprising, a modifiable issue rate unit having means to transmit information signals at different transmission rates in response to control signals, said issue rate unit having an output for transmitting, for each of one or more channels, at a maximum-channel-peak-cell-rate or at a rate below the maximum-channel-peak-cell-rate as a function of the control signals for each channel and wherein said issue rate unit has means for decreasing said transmission rate exponentially as a function of the control signals.

48. A multiple issue rate source for use in a communication system where the communication system has one or more multiple issue rate sources connected through one or more channels to a plurality of destinations and has control signal generating means for generating control signals for the channels for reactively controlling the transmission rates over the channels, said multiple issue rate source comprising, a modifiable issue rate unit having means to transmit information signals at different transmission rates in response to control signals, said issue rate unit having an output for transmitting, for each of one or more channels, at a maximum-channel-peak-cell-rate or at a rate below the maximum-channel-peak-cell-rate as a function of the control signals for each channel and wherein said issue rate unit, after decreasing said transmission rate, has means for increasing said transmission rate exponentially in response as a function of the absence of the control signals.

49. The multiple issue rate source of Claim 48 wherein the rate of increasing said transmission rate is less than the rate of decreasing said transmission rate.

\* \* \* \* \*